US012668289B2

(12) United States Patent

Herzog et al.

(10) Patent No.: US 12,668,289 B2

(45) Date of Patent: Jun. 30, 2026

(54) METHODS AND SYSTEMS TO DETERMINE AN ESTIMATED TIME OF ARRIVAL FOR RAILCARS

(71) Applicant: Chevron Phillips Chemical Company LP, The Woodlands, TX (US)

(72) Inventors: Jacob M. Herzog, The Woodlands, TX (US); Robert B. Railey, The Woodlands, TX (US); Ra Inta, The Woodlands, TX (US); Julianna Alexander, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 395 days.

(21) Appl. No.: 18/426,012

(22) Filed: Jan. 29, 2024

(65) Prior Publication Data

US 2025/0242845 A1 Jul. 31, 2025

(51) Int. Cl.
*B61L 25/02* (2006.01)
*B61L 15/00* (2006.01)
*G06N 20/00* (2019.01)

(52) U.S. Cl.
CPC ......... *B61L 25/025* (2013.01); *B61L 15/0072* (2013.01); *G06N 20/00* (2019.01)

(58) Field of Classification Search
CPC ...... B61L 25/00; B61L 15/0072; G06N 20/25
USPC ................................................... 246/122 R
See application file for complete search history.

(56) References Cited

U.S. PATENT DOCUMENTS

| | | | | |
|---|---|---|---|---|
| 12,039,863 B2 * | 7/2024 | Meads, Jr. | ............. | G08G 1/017 |
| 12,332,340 B2 * | 6/2025 | Daoud | .................... | G01S 13/91 |

| | | | | |
|---|---|---|---|---|
| 2017/0297594 A1 * | 10/2017 | Goforth | .................. | B61L 27/20 |
| 2019/0145791 A1 * | 5/2019 | Rempel | ............... | G08G 1/0116 |
| | | | | 701/410 |
| 2021/0107545 A1 * | 4/2021 | Howard | ................ | B61L 25/025 |
| 2022/0242467 A1 * | 8/2022 | Guibene | ................. | B61L 27/10 |
| 2023/0211817 A1 * | 7/2023 | Tripathy | ................ | B61L 27/04 |
| | | | | 246/182 R |

FOREIGN PATENT DOCUMENTS

| | | | | | |
|---|---|---|---|---|---|
| CA | 3219650 A1 | * | 5/2024 | ............. | B61L 29/30 |
| CN | 112580204 A | * | 3/2021 | ............. | G06F 30/20 |
| KR | 2706274 B1 | * | 9/2024 | | |
| WO | WO-2016047591 A1 | * | 3/2016 | ............. | B61L 27/00 |
| WO | WO-2019019189 A1 | * | 1/2019 | ............. | G06N 20/00 |
| WO | WO-2025049005 A1 | * | 3/2025 | ............. | B61L 23/32 |

* cited by examiner

*Primary Examiner* — Troy Chambers

(74) *Attorney, Agent, or Firm* — Conley Rose, P.C.

(57) ABSTRACT

A method for using a trained machine learning (ML) model to determine an ETA of a railcar to a destination and to generate a fleet readiness alert, including: collecting railcar trip information; collecting coordinates of a rail station associated with a rail carrier; creating a joined dataset by combining the trip information and coordinates; performing feature engineering (FE) on the joined dataset to create a feature engineered output including a plurality of engineered features; combining the joined dataset with the feature engineered output to create ML model feature inputs for the trained ML model; and activating the ML model, which accepts the model feature inputs as an input, determines the ETA of the railcar, and generates the fleet readiness alert based on the determined ETA of the railcar, indicating at least a usability status of a fleet of railcars at the depot yard within a fixed time.

20 Claims, 23 Drawing Sheets

Percent of trips showing API ETA at outset

| | 350 | |
|---|---|---|
| 302 | API Shows origin at outset |
| 304 | API Does not show origin at outset |

302
46%

304

300

400

Relationship between Trip Length and Original ETA error

ETA CALCULATION ERROR RATE

404

406

RETURN TRIP LENGTH 402

<u>DATAPOINT</u> ∼ 802     ∕∼ 800

8002 ⌐ car_init
8004 ⌐ car_no
8006 ⌐ release_city
8008 ⌐ release_state
8010 ⌐ trip_no
8012 ⌐ return_city
8014 ⌐ return_state
8016 ⌐ one_way_round
8018 ⌐ route_code
8020 ⌐ miles_from_prev
8022 ⌐ road
8024 ⌐ ie
8026 ⌐ loc_city
8028 ⌐ loc_state
8030 ⌐ clm_date_time_timezone
8032 ⌐ clm_date_time
8034 ⌐ clm_event
8036 ⌐ sight_code
8038 ⌐ rr_eta_datetime
8040 ⌐ clm_diff_time
8042 ⌐ dwell_time
8044 ⌐ loc_spic
8046 ⌐ dest_city
8048 ⌐ dest_state
8050 ⌐ latitude
8052 ⌐ longitude
8054 ⌐ cust_rel_date_time
8056 ⌐ bad_order_days
8058 ⌐ trip_cls_date_time
8060 ⌐ orig_eda_eta_origin
8062 ⌐ bol_no
8064 ⌐ return_longitude
8066 ⌐ return_latitude
8068 ⌐ bad_order_end
8070 ⌐ trip_start_date_x
8072 ⌐ trip_start_date_w
8074 ⌐ trip_end_date
8076 ⌐ days_to_rt_eta
8078 ⌐ trip_start_date
8080 ⌐ days_into_trip
8082 ⌐ days_to_close
8084 ⌐ miles_into_trip
8086 ⌐ avg_train_speed
8088 ⌐ trip_dwell_time
8090 ⌐ trip_clms
8092 ⌐ 10_clms_miles_into_trip
8094 ⌐ 10_clm_back_date
8096 ⌐ days_to_10_back_clm
8098 ⌐ 25_clms_miles_into_trip
8100 ⌐ 25_clm_back_date
8102 ⌐ days_to_25_back_clm
8104 ⌐ distance_to_origin
8106 ⌐ 10_clms_avg_train_speed
8108 ⌐ 25_clms_avg_train_speed
8110 ⌐ season 8200 ⌐ ml_eta_prediction

| Name 902 | Type 904 | Source 906 |
|---|---|---|
| Last 10 CLM Average Train Speeds 908 | Numeric | DETERMINED |
| Latitude 910 | Numeric | RETRIEVED |
| Distance to Destination 912 | Numeric | DETERMINED |
| Longitude 914 | Numeric | RETRIEVED |
| Average Train Speed 916 | Numeric | DETERMINED |
| Last 25 CLM Average Train Speeds 918 | Numeric | DETERMINED |
| Days to Determined ETA 920 | Numeric | RETRIEVED |
| Days into Trip 922 | Numeric | DETERMINED |
| Railroad 924 | Categorical | RETRIEVED |
| CLM Event 926 | Categorical | RETRIEVED |
| Season 928 | Categorical | DETERMINED |
| Sight Code 930 | Categorical | RETRIEVED |

*FIG. 9*

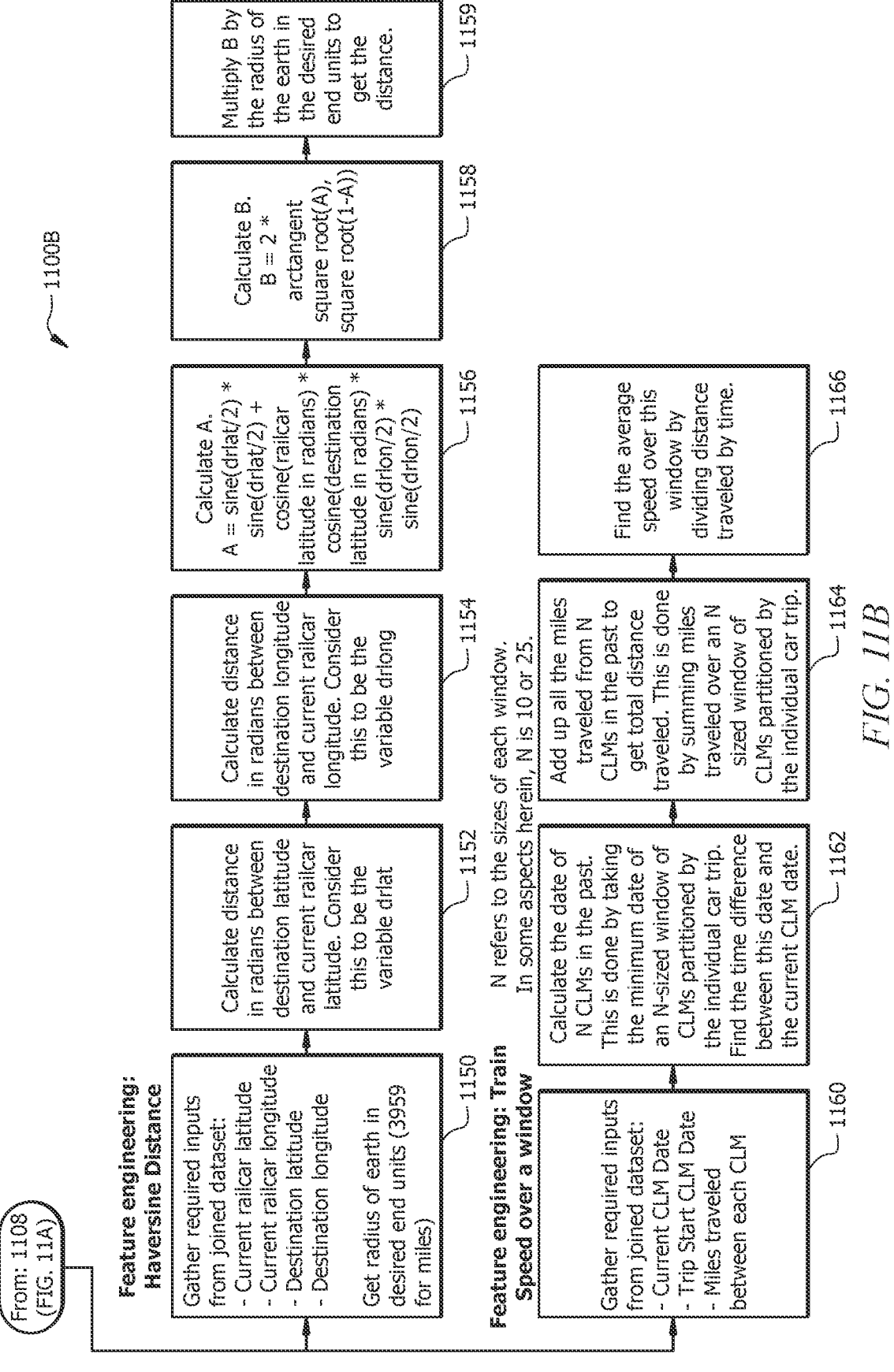

Feature engineering: Haversine Distance

Gather required inputs from joined dataset:
- Current railcar latitude
- Current railcar longitude
- Destination latitude
- Destination longitude Get radius of earth in desired end units (3959 for miles) — 1150

Calculate distance in radians between destination latitude and current railcar latitude. Consider this to be the variable drlat — 1152

Calculate distance in radians between destination longitude and current railcar longitude. Consider this to be the variable drlong — 1154

Calculate A.
A = sine(drlat/2) * sine(drlat/2) + cosine(railcar latitude in radians) * cosine(destination latitude in radians) * sine(drlon/2) * sine(drlon/2) — 1156

Calculate B.
B = 2 * arctangent square root(A), square root(1-A)) — 1158

Multiply B by the radius of the earth in the desired end units to get the distance. — 1159

1100B

Feature engineering: Train Speed over a window

N refers to the sizes of each window. In some aspects herein, N is 10 or 25.

Gather required inputs from joined dataset:
- Current CLM Date
- Trip Start CLM Date
- Miles traveled between each CLM — 1160

Calculate the date of N CLMs in the past. This is done by taking the minimum date of an N-sized window of CLMs partitioned by the individual car trip. Find the time difference between this date and the current CLM date. — 1162

Add up all the miles traveled from N CLMs in the past to get total distance traveled. This is done by summing miles traveled over an N sized window of CLMs partitioned by the individual car trip. — 1164

Find the average speed over this window by dividing distance traveled by time. — 1166

From: 1108 (FIG. 11A)

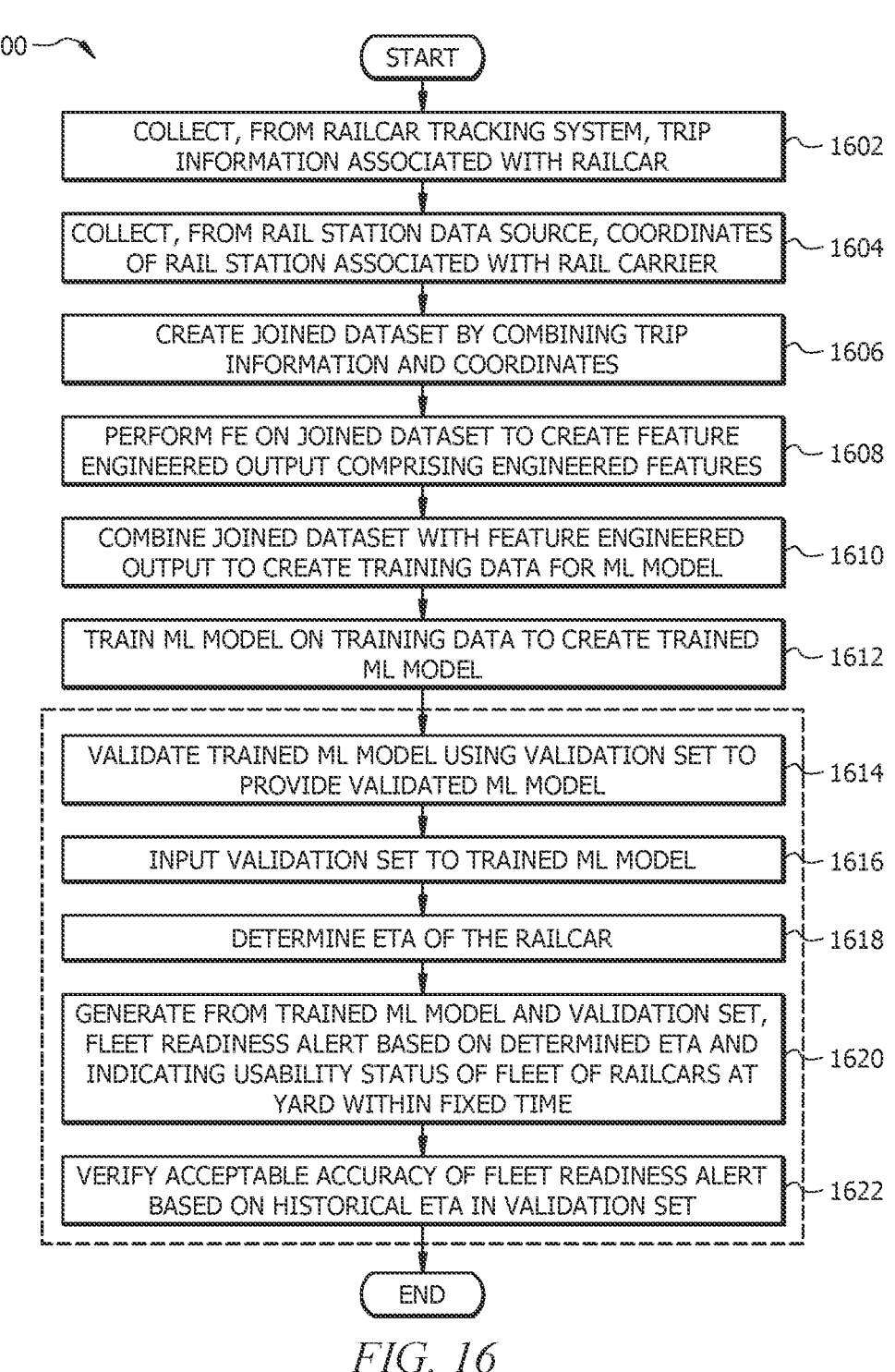

START

COLLECT, FROM RAILCAR TRACKING SYSTEM, TRIP
INFORMATION ASSOCIATED WITH RAILCAR ⟋ 1602

COLLECT, FROM RAIL STATION DATA SOURCE, COORDINATES
OF RAIL STATION ASSOCIATED WITH RAIL CARRIER ⟋ 1604

CREATE JOINED DATASET BY COMBINING TRIP
INFORMATION AND COORDINATES ⟋ 1606

PERFORM FE ON JOINED DATASET TO CREATE FEATURE
ENGINEERED OUTPUT COMPRISING ENGINEERED FEATURES ⟋ 1608

COMBINE JOINED DATASET WITH FEATURE ENGINEERED
OUTPUT TO CREATE TRAINING DATA FOR ML MODEL ⟋ 1610

TRAIN ML MODEL ON TRAINING DATA TO CREATE TRAINED
ML MODEL ⟋ 1612

VALIDATE TRAINED ML MODEL USING VALIDATION SET TO
PROVIDE VALIDATED ML MODEL ⟋ 1614

INPUT VALIDATION SET TO TRAINED ML MODEL ⟋ 1616

DETERMINE ETA OF THE RAILCAR ⟋ 1618

GENERATE FROM TRAINED ML MODEL AND VALIDATION SET,
FLEET READINESS ALERT BASED ON DETERMINED ETA AND
INDICATING USABILITY STATUS OF FLEET OF RAILCARS AT
YARD WITHIN FIXED TIME ⟋ 1620

VERIFY ACCEPTABLE ACCURACY OF FLEET READINESS ALERT
BASED ON HISTORICAL ETA IN VALIDATION SET ⟋ 1622

END

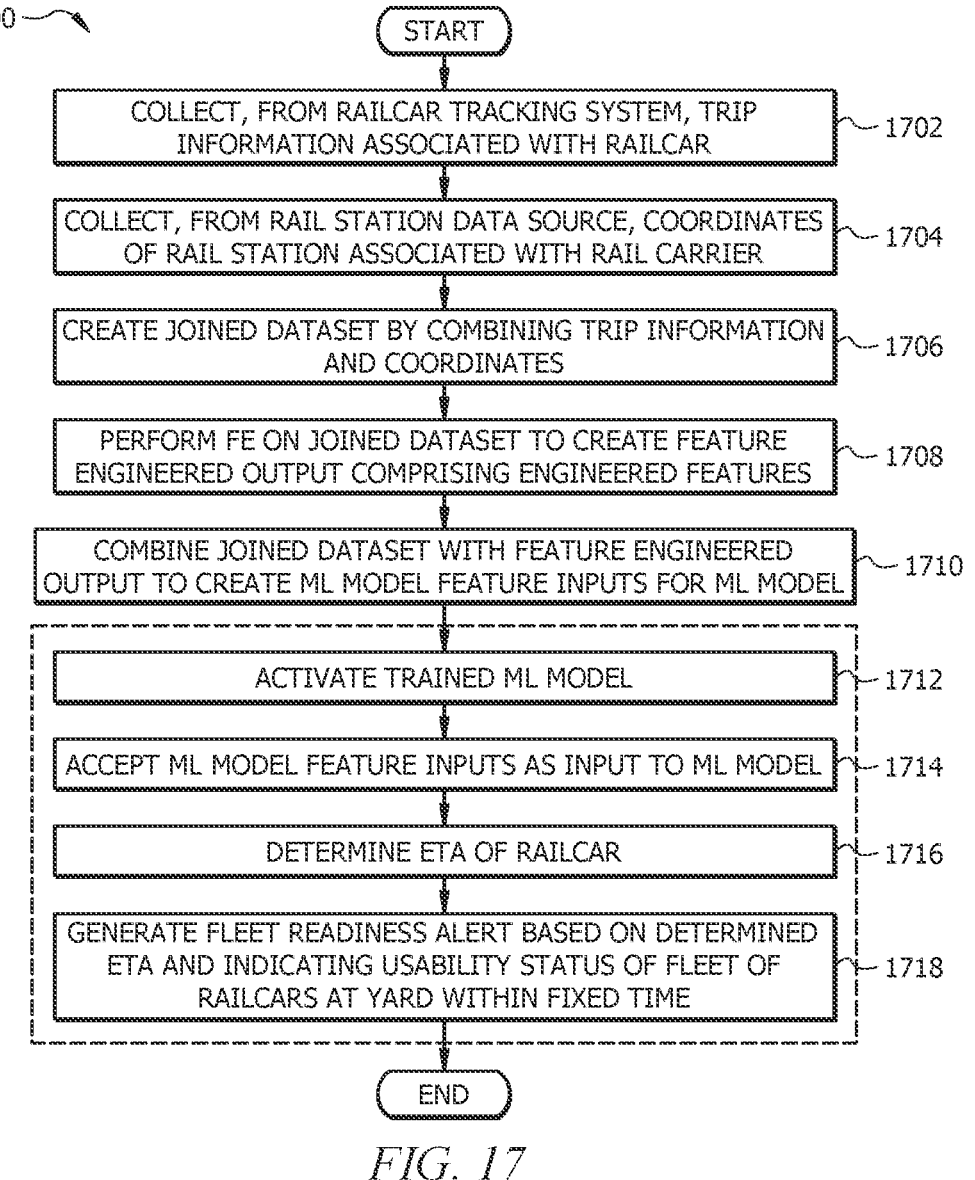

START

COLLECT, FROM RAILCAR TRACKING SYSTEM, TRIP INFORMATION ASSOCIATED WITH RAILCAR — 1702

COLLECT, FROM RAIL STATION DATA SOURCE, COORDINATES OF RAIL STATION ASSOCIATED WITH RAIL CARRIER — 1704

CREATE JOINED DATASET BY COMBINING TRIP INFORMATION AND COORDINATES — 1706

PERFORM FE ON JOINED DATASET TO CREATE FEATURE ENGINEERED OUTPUT COMPRISING ENGINEERED FEATURES — 1708

COMBINE JOINED DATASET WITH FEATURE ENGINEERED OUTPUT TO CREATE ML MODEL FEATURE INPUTS FOR ML MODEL — 1710

ACTIVATE TRAINED ML MODEL — 1712

ACCEPT ML MODEL FEATURE INPUTS AS INPUT TO ML MODEL — 1714

DETERMINE ETA OF RAILCAR — 1716

GENERATE FLEET READINESS ALERT BASED ON DETERMINED ETA AND INDICATING USABILITY STATUS OF FLEET OF RAILCARS AT YARD WITHIN FIXED TIME — 1718

END

*FIG. 17*

SYSTEM 1800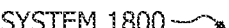

```
┌────────────────────────────┐      ┌────────────────────────────┐
│     DEPOT YARD             │◄────►│  RAILWAY ACCESS SYSTEM     │
│        1870                │      │         1850               │
│  ┌──────────────────┐      │      │   ┌──────────────────┐     │
│  │  RAILCAR 1880    │◄─────┼──────┼──►│   TRAIN 1860     │     │
│  └──────────────────┘      │      │   └──────────────────┘     │
└────────────────────────────┘      └────────────────────────────┘
                                                  ▲
                                                  │
                                                  ▼
┌──────────────┐  ┌──────────────┐  ┌──────────────┐  ┌──────────────┐  ┌──────────────┐
│ RAIL STATION │  │    DATA      │  │  RAILCAR     │  │    RAIL      │  │ DESTINATION  │
│ DATA SOURCE  │◄►│ ACQUISITION  │◄►│  TRACKING    │◄►│  CARRIER     │◄►│    1872      │
│    1832      │  │ SUB-SYSTEM   │  │  SYSTEM      │  │    1890      │  └──────────────┘
└──────────────┘  │    1840      │  │   1830       │  │ ┌──────────┐ │
                  └──────────────┘  └──────────────┘  │ │  RAIL    │ │
                         │                            │ │ STATION  │ │
                         ▼                            │ │  1892    │ │
                  ┌──────────────┐                    │ └──────────┘ │
                  │ DATA STORAGE │                    └──────────────┘
                  │ SUBSYSTEM    │                    ┌──────────────┐
                  │    1842      │                    │  USER I/F    │
                  └──────────────┘                    │  SUBSYSTEM   │
                         │                            │    1844      │
                         ▼                            └──────────────┘
                                                             │
                                                             ▼
```

┌──────────────────────────────────────────────────────────────────────────┐
│              FLEET READINESS ALERT GENERATOR 1802                          │
│  ┌──────────────┐    ┌──────────────┐                                     │
│  │  PROCESSOR   │    │ JOINED DATASET│                                     │
│  │    1804      │    │     1812      │──────────┐                          │
│  └──────────────┘    └──────────────┘          │                          │
│  ┌──────────────┐    ┌──────────────┐    ┌──────────────────┐             │
│  │   MEMORY     │    │  FE OUTPUT 1814│    │ ML MODEL FEATURE │            │
│  │    1806      │    │ ┌────────────┐ │◄──►│  INPUTS 1818     │            │
│  └──────────────┘    │ │ ENGINEERED │ │    └──────────────────┘           │
│  ┌──────────────┐    │ │FEATURES 1816│ │    ┌──────────────────┐          │
│  │TRIP INFORMATION│  │ └────────────┘ │    │ TRAINED ML MODEL │           │
│  │    1808      │    └──────────────┘    │     1820         │            │
│  └──────────────┘                        │ ┌──────────────┐ │            │
│  ┌──────────────┐    ┌──────────────┐    │ │DETERMINED ETA│ │            │
│  │ COORDINATES  │    │FLEET READINESS│◄──►│ │    1822      │ │            │
│  │    1810      │    │  ALERT 1824  │    │ └──────────────┘ │            │
│  └──────────────┘    └──────────────┘    └──────────────────┘            │
└──────────────────────────────────────────────────────────────────────────┘

| | Data Point | Alternative Name | Description |
|---|---|---|---|
| 8002 | car_init | Car Initial | Alphabetic Characters for Railcar Name |
| 8004 | car_no | Car Number | Numeric Characters for Railcar Name |
| 8006 | release_city | Release City | City the car was released from (origin of the return trip) |
| 8008 | release_state | Release State | State the car was released from (origin of the return trip) |
| 8010 | trip_no | Trip Number | A unique internal number assigned to the trip. |
| 8012 | return_city | Return City | The city the car is returning to. This is where we are predicting an ETA to for the inbound trip. |
| 8014 | return_state | Return State | The state the car is returning to. This is where we are predicting an ETA to for the inbound trip. |
| 8016 | one_way_round | One Way Round | A unique internal number assigned to the trip. |
| 8018 | route_code | Route Code | A binary outcome for if the trip is one-way(O) or round-trip (R) |
| 8020 | miles_from_prev | Miles From Previous | How many miles the current SPLC is from the prior SPLC |
| 8022 | road | Roadious | The railroad the car was on for the CLM |
| 8024 | le | Loaded Empty Indicator | Binary for if car is L(Loaded) or E(Empty) |
| 8026 | loc_city | Location City | Current Location City |
| 8028 | loc_state | Location State | Current Location Sate |
| 8030 | clm_date_time_timezone | CLM Timezone | Timezone for the current CLM Record |
| 8032 | clm_date_time | CLM Date and Time | Date and Time for the current CLM Record |
| 8034 | clm_event | CLM Event | Description of the special event if there is one. |
| 8036 | sight_code | Sight Code | Alphabetic code that relates to what the CLM represents |
| 8038 | rr_eta_datetime | Railroad ETA Date and Time | Estimated arrival time to the destination provided by a traditional, contemporary railcar tracking system |
| 8040 | clm_diff_time | Time Difference Between CLMs | The time (in hours) since the previous CLM for the car |
| 8042 | dwell_time | Dwell Time | The time (in hours) that the car spent at a scheduled stop without moving |
| 8044 | loc_splc | Location SPLC | SPLC (standard point location code) number for the current location |
| 8046 | dest_city | Destination City | The destination city the car is headed to on the trip |

| | Data Point | Alternative Name | Description |
|---|---|---|---|
| | | 804 | 806 |
| | | | 802 |
| 8048 | dest_state | Destination State | The destination state for the car on the trip |
| 8050 | latitude | Latitude | Current Latitude of the car |
| 8052 | longitude | Longitude | Current Longitude of the car |
| 8054 | cust_rel_date_time | Customer Release Date Time | Date and Time that the customer released the car to return to the plant |
| 8056 | bad_order_days | Number of Bad Order Days | Number of days that the car has been bad ordered (in need of repairs) during the trip. |
| 8058 | trip_cls_date_time | Trip Close Date and Time | The date and time that the trip finished in the system. |
| 8060 | orig_eda_eta_origin | Original ETA to Original Origin | Original estimated date that the car would return to the origin. |
| 8062 | bol_no | Bill of Lading Number | Internal BOL Number |
| 8064 | return_longitude | Return Longitude | Longitude of the return destination |
| 8066 | return_latitude | Return Latitude | Latitude of the return destination |
| 8068 | bad_order_end | Bad Order End Date | Date that the car was realsed from maintenance repairs |
| 8070 | trip_start_date_x | Trip Start date for X CLM Event | The date that the car was pulled from the customers location and placed on the rail line. |
| 8072 | trip_start_date_w | Trip Start date for W CLM Event | The date the the car was flagged for release by the customer. |
| 8074 | trip_end_date | Trip End Date | Date the car arrived at the destination (origin) |
| 8076 | days_to_rt_eta | Days to traditional, contemporary railcar tracking system | The number of days that the current date is away from the ETA provided by a traditional, contemporary railcar tracking system |
| 8078 | trip_start_date | Trip Start Date | The date the the trip start for the X CLM event if provided, the W if an X is not available, and if no W or X event is available then it will take the customer release date provided by a traditional, contemporary railcar tracking system |
| 8080 | days_into_trip | Days Into the Trip | The number of days between the date that the trip started and the current CLM |
| 8082 | days_to_close | Days Until Trip Closure | This is used for scoring only and not in prediction. |
| 8084 | miles_into_trip | Miles Into the Trip | The number of miles that the car has traveled so far in the trip. |

| | Data Point | Alternative Name | Description |
|---|---|---|---|
| 802 | | | |
| 8086 | avg_train_speed | Average Train Speed | The average speed of the train so far in the trip. |
| 8088 | trip_dwell_time | Total Trip Dwell Time | The total dwell time during the trip. |
| 8090 | trip_clms | Total Number of Trip CLMs | The total number of CLMs that the trip has had so far. |
| 8092 | 10_clms_miles_into_trip | Miles Moved Over Past 10 CLMs | The number of miles that the car has traveled over the past 10 CLMs |
| 8094 | 10_clm_back_date | Date of 10 CLMs prior | The date of the 10th CLM prior. Used in calculations of speed and distance. |
| 8096 | days_to_10_back_clm | Number of Days to 10 CLMs Prior | The number of days to the 10th prior CLM |
| 8098 | 25_clms_miles_into_trip | Miles Moved Over Past 25 CLMs | The number of miles that the car has traveled over the past 25 CLMs |
| 8100 | 25_clm_back_date | Date of 25 CLMs Prior | The date of the 25th CLM prior. Used in calculations of speed and distance. |
| 8102 | days_to_25_back_clm | Number of Days to 25 CLMs Prior | The number of days to the 25th prior CLM |
| 8104 | distance_to_origin | Distance to the Origin | The current haversine distance of the cars current location to the destination location. |
| 8106 | 10_clms_avg_train_speed | Average Train Speed over Past 10 CLMs | The average speed of the train over the past 10 CLMs |
| 8108 | 25_clms_avg_train_speed | Average Train Speed over Past 25 CLMs | The average speed of the train over the past 25 CLMs |
| 8110 | season | Season | The current season based on the CLM date. |
| 8200 | ml_eta_prediction | ML ETA Prediction | The prediction made by the Machine Learning model given the model inputs. |

METHODS AND SYSTEMS TO DETERMINE AN ESTIMATED TIME OF ARRIVAL FOR RAILCARS

FIELD OF THE DISCLOSURE

The present disclosure relates to methods and systems to determining an estimated time of arrival for vehicles to a destination, and more particularly, to determining a time of arrival for railcars conveying goods such as polyolefin products, and other products, including but not limited to, normal alpha olelfins, and poly alpha olefins.

BACKGROUND

Railcars are a primary means of inventory distribution for certain products. Effective inventory distribution depends on predicting, with a certain degree of accuracy, when shipped products will arrive at a destination. Even minute errors in supply chain management, including errors in railcar estimated time of arrival (ETA) predictions can cause significant detrimental impacts on the day-to-day operations of not only the railways and railcars involved in the inventory distribution, but the entire supply chain, including, for example, creating a shortage of railcars in depots where railcars are needed while at the same time creating a glut of railcars where those railcars cannot be used for inventory distribution.

Accurate ETA predictions are especially important when railcars are involved in logistics operations; in rail transport operations generally, an exact time of arrival of the shipment is unknown at the moment that the railcar departs an origin depot. Instead, an ETA for the railcar to a destination is generally used for planning subsequent supply chain operations with the once again available railcar. Contemporary, traditional railcar tracking systems and proprietary application programming interfaces (APIs) provided by rail carriers directly have systematic, unavoidable shortcomings. Traditional rail tracking systems cover the entire journey of the railcar using a statistical average transit time to predict when a railcar will arrive at its destination, based on route averages. This manner of ETA determination, relying on a speed/time approach (e.g., taking distance remaining and dividing by railcar velocity) or a statistical approach (e.g., using the average transit time for previous trips), becomes increasingly inaccurate and undependable the longer the trip of the railcar lasts.

APIs are proprietary and use unknown methodologies. While APIs tend to be more accurate than traditional rail tracking systems, APIs only report an ETA to a destination when the railcar is on a delivery railroad owned or controlled by the provider of the API. Consequently, the ETA prediction is limited only to the destination on the last railroad of a trip (the "delivery railroad"). When using an API, the ETA during the rest of the trip is typically a mystery, which risks creating significant problems for logistics operations.

There is an ongoing need to accurately and dynamically manage railcar transportation that is adaptable to transport length ranges, differences in railroad ownership and control, unexpected interruptions, fleet disposition, and product logistics.

SUMMARY

This summary is provided to introduce a selection of concepts in a simplified form that are further described herein. This summary is not intended to identify required or essential features of the claimed subject matter. Nor is this summary intended to be used to limit the scope of the claimed subject matter.

Disclosed herein is a method for training a machine learning (ML) model to determine an estimated time of arrival (ETA) of a railcar to a depot yard and to generate a fleet readiness alert, the method comprising: collecting, from a railcar tracking system, a trip information associated with the railcar; collecting, from a rail station data source, coordinates of at least one rail station, each of the at least one rail stations being associated with a rail carrier; creating a joined dataset by combining the trip information and the coordinates; performing feature engineering (FE) on the joined dataset to create a feature engineered output, the feature engineered output comprising a plurality of engineered features; combining the joined dataset with the feature engineered output to create training data for the ML model; training the ML model on the training data to create the trained ML model; validating the trained ML model using a validation set to provide a validated ML model; and wherein validating comprises: inputting the validation set to the trained ML model, determining the ETA of the railcar, generating, from the trained ML model and the validation set, the fleet readiness alert based on the determined ETA and indicating at least a usability status of a fleet of railcars at the depot yard within a fixed time, and verifying an acceptable accuracy of the fleet readiness alert based on at least one historical ETA in the validation set.

Further disclosed herein is a method for using a trained machine learning (ML) model to determine an estimated time of arrival (ETA) of a railcar to a depot yard and to generate a fleet readiness alert, the method comprising: collecting, from a railcar tracking system, a trip information associated with the railcar; collecting, from a rail station data source, coordinates of at least one rail station, each of the at least one rail stations being associated with a rail carrier; creating a joined dataset by combining the trip information and the coordinates; performing feature engineering (FE) on the joined dataset to create a feature engineered output, the feature engineered output comprising a plurality of engineered features; combining the joined dataset with the feature engineered output to create ML model feature inputs for the ML model; activating the trained ML model, the trained ML model being configured to at least: accept the ML model feature inputs as an input to the ML model; determine the ETA of the railcar; and generate the fleet readiness alert, the fleet readiness alert based on the determined ETA of the railcar and indicating at least a usability status of a fleet of railcars at the depot yard within a fixed time.

Additionally disclosed herein is a system for using a trained machine learning (ML) model to determine an estimated time of arrival (ETA) of a railcar to a depot yard and generate a fleet readiness alert, the system comprising: a railway access system, the railway access system: having at least one train configured to access at least one rail carrier, the railcar being configured to mechanically couple to a train of the at least one trains, and the at least one rail carrier configured to transport the railcar between the depot yard and a destination; a data acquisition subsystem communicatively coupled to a railcar tracking system and a rail station data source, and further coupled to a data storage subsystem; a fleet readiness alert generator configured to monitor the railcar, the fleet readiness alert generator comprising a processor and a non-transitory memory and further configured to perform operations comprising: collecting by the data acquisition subsystem, from the railcar tracking system, a trip information associated with the railcar; storing the trip information in the data storage subsystem; collecting by the data acquisition subsystem, from the rail station data source, coordinates of at least one rail station, each of the at least one rail stations being associated with a rail carrier of the at least one rail carriers; storing the coordinates in the data storage subsystem; creating a joined dataset by combining the trip information and the coordinates; performing feature engineering (FE) on the joined dataset to create a feature engineered output, the feature engineered output comprising a plurality of engineered features; combining the joined dataset with the feature engineered output to create ML model feature inputs for the ML model; activating the trained ML model, the trained ML model being configured to at least: accept the ML model feature inputs as an input to the trained ML model; determine the ETA of the railcar; and generate the fleet readiness alert, the fleet readiness alert based on the determined ETA of the railcar and indicating at least a usability status of a fleet of railcars at the depot yard within a fixed time.

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 8 is a record from training data for a machine learning (ML) model configured to determine an ETA of a railcar according to an aspect.

FIG. 9 is a table illustrating features of an ML model configured to determine an ETA of a railcar according to an aspect.

FIGS. 11A-11C collectively are a process flow diagram illustrating a training process for an ML model configured to determine an ETA of a railcar according to an aspect.

FIG. 16 is a flow chart illustrating a method for training a machine learning (ML) model to determine an estimated time of arrival (ETA) of a railcar to a depot yard and generate a fleet readiness alert according to an aspect.

FIG. 17 is a flow chart illustrating a method for using a trained machine learning (ML) model to determine an estimated time of arrival (ETA) of a railcar to a depot yard and generate a fleet readiness alert according to an aspect.

FIG. 18 is a block diagram illustrating a system using a trained machine learning (ML) model to determine an estimated time of arrival (ETA) of a railcar to a depot yard and generate a fleet readiness alert according to an aspect.

FIG. 20A-20C are reference tables providing additional information about the datapoints of FIG. 8 according to an aspect.

DETAILED DESCRIPTION

Figure 1:
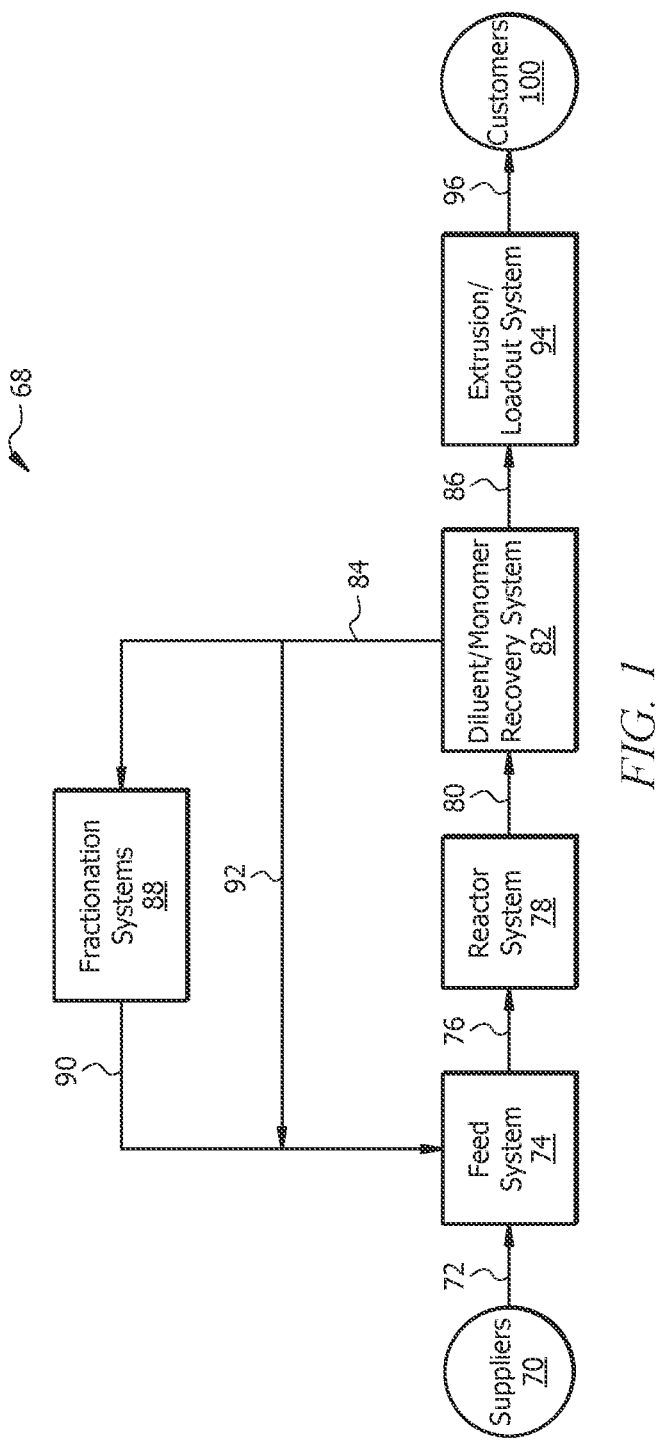
FIG. 1 is a block diagram illustrating a manufacturing process for producing polyolefins or their copolymers according to an aspect.

It should be understood at the outset that although illustrative implementations of one or more aspects are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure is generally directed to tracking an estimated time of arrival (ETA) of a railcar integrated into an inventory distribution system for certain products, and specifically directed to training, and using, a machine learning (ML) model to predict the ETA of a railcar integrated into an inventory distribution system for hydrocarbon products on a commercial scale. As used herein, hydrocarbon products include but are not limited to polyolefins, normal alpha olefins (NAO), poly alpha olefins (PAO), specialty chemicals, cyclohexane, dicyclopentadiene (DCPD), heavy aromatic distillate (HAD), and other products.

The systems and methods of this disclosure operate unconventionally by training an ML model to predict the ETA of a railcar integrated into an inventory distribution system and also utilizing the trained ML model to predict the ETA of a railcar integrated into an inventory distribution system in a production environment. In aspects herein, the ML model is trained using data points obtained from a rail tracking system combined with location data obtained from a product of service provider specializing in rail location data. Thus, the ML model is usable with existing data sources to deliver ETA predictions having a consistent, high accuracy not seen in traditional, contemporary alternatives.

Additionally, the model uses feature engineering (FE) on the above data points and location data to create additional model features that did not previously exist in any usable form. That is, the disclosed ML model exposes and exploits previously unknown, unobvious patterns in railcar data attributes to provide railcar ETAs having improved accuracy over traditional, contemporary methodologies. These additional model features further increase the accuracy of the ETA predictions of the ML model. Aspects of the ML model utilize computationally efficient and performant GBT techniques. In some aspects, the ML model needs a relatively small amount of data (e.g., covering only two years, well within the amount of logistical records kept by many commercial logistics operations) to train the disclosed ML model. As the disclosed ML model utilizes GBTs, any number of fast, efficient, and resource-light GBT implementations are usable to implement the disclosed ML model. Access to specialized high performance or high-power consumption compute resources is not mandatory to implement the disclosed ML model.

Further, by providing a trained ML model exhibiting greater ETA prediction accuracy than traditional, contemporary alternatives, aspects disclosed herein reduce uncertainty in the supply chain. Reducing uncertainty in the supply chain allows for elimination of resource-intensive redundancies traditionally implemented to counter expected uncertainties (e.g., maintaining an excess number of railcars at a depot that are only needed when an ETA prediction is wrong and other railcars do not arrive when expected). Such resources include limited physical space in depot yards for railcars; limited trained personnel to maintain and move railcars into position for usage; a limited supply of excess railcars, etc.

Reducing uncertainty in the empty inbound pipeline of railcars integrated into an inventory distribution system is particularly advantageous in logistical operations. Uncertainty in the empty inbound pipeline potentially causes severe, even catastrophic, impacts on production operations. As an additional benefit, customers who receive goods via railcars managed by the inventory distribution system also benefit from reduced uncertainty by utilizing the more accurate delivery ETAs (based on the more accurate railcar ETAs). The internal logistics operations of the customer are improved in turn.

The systems and methods of this disclosure are usable as part of a larger process to produce polyolefin products on a commercial scale. For example, a block diagram of a manufacturing process 68 for producing polyolefins, such as polyethylene, polypropylene, or copolymers thereof, is depicted in FIG. 1. Various suppliers 70 may provide reactor feedstocks 72 such as monomer, comonomer, and diluent to the manufacturing system 78 (also referred to as a "reactor system" in FIG. 1) via pipelines, trucks, cylinders, drums, and so forth. The feedstocks 72 are provided to a feed system 74, where the feedstocks 72 may be stored or may be treated or processed prior to the introduction of the feedstocks 72 as feed 76 to the reactor system 78.

A polymer resin product (e.g., a product suitable for transport via railcar using the presently disclosed techniques) may be made using a reactor system 78 that includes a polymerization reactor vessel, such as a liquid-phase or a gas-phase reactor. In the polymerization reactor vessels, one or more olefin monomers are polymerized to form a product including polymer particulates, typically called fluff. One or more catalysts that facilitate polymerization of the monomer are typically added to the polymerization reactor vessels. The catalyst or catalysts may be selected to achieve the predetermined fluff properties for each component polymer in the polyolefin resin. Further, the reaction conditions, such as temperature, pressure, flow rates, mechanical agitation, product takeoff, component concentrations, polymer production rate, residence time and so forth, may also be selected to achieve the predetermined properties.

The discharge 80 of the reactors within the reactor system 78 may include the polymer fluff as well as non-polymer components, such as diluent, unreacted monomer/comonomer, and residual catalyst. The discharge 80 may be subsequently processed, such as by a diluent/monomer recovery system 82, to separate non-polymer components 84 (e.g., diluent and unreacted monomer) from the polymer fluff 86. The diluent/monomer recovery system 82 may have a low-pressure recovery flash of the diluent/monomer with an associated recycle compression or may eliminate this process step using only a high-pressure flash.

With or without the low-pressure flash, the untreated recovered non-polymer components 84 may be further processed, such as by a fractionation system 88, to remove undesirable heavy and light components. Fractionated product streams 90 may then be returned to the reactor system 78 via the feed system 74. Alternatively, the non-polymer components 84 may recycle more directly to the feed system 74 (as indicated by reference numeral 92), bypassing the fractionation system 88, and thus avoiding the energy consumption of the fractionation system 88.

As discussed in more detail below, in the extrusion/loadout systems 94, the fluff 86 is typically extruded to produce polymer pellets 96 with the desired mechanical, physical, and melt characteristics. In general, the polyolefin pellets may then be transported to a product load-out area where the pellets may be stored, blended with other pellets, and/or loaded into railcars, trucks, bags, and so forth, for distribution to customers 100.

Figure 2:
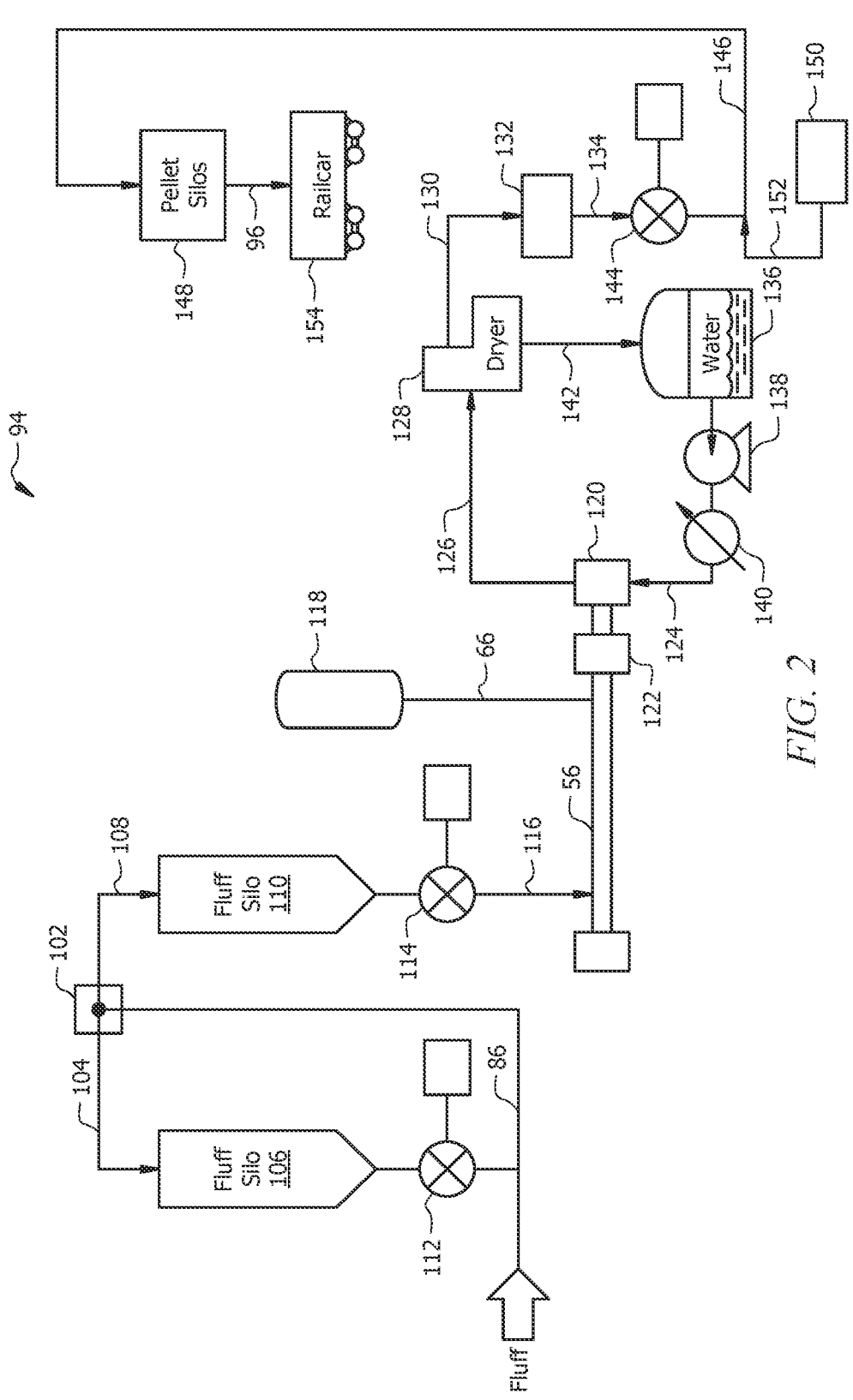
FIG. 2 is a process flow diagram illustrating the extrusion/loadout system of FIG. 1 according to an aspect.

Turning now to FIG. 2, a process flow diagram of the extrusion/loadout system 94 of FIG. 1 is illustrated according to an aspect. Polyolefin fluff 86 may be pneumatically transferred, for example, using a dilute phase blower, through a valve 102 in the extruder/loadout system 94, and either into a conduit 104 to a fluff silo 106, or into a conduit 108 to an extruder feed tank 110. The fluff silo 106 may be used to provide surge capacity in the extrusion/loadout system 94 during various operations, such as a shutdown of the extruder, among others. On the other hand, the fluff silo 106 may also accumulate fluff to allow for full-rate operation of the extruder while the upstream reactor system 78 "catches up" during start up of the polymerization reactors. The polyolefin fluff in silo 106 may be pneumatically transferred to the extruder feed tank 110 through rotary valve 112 with the aid of a blower system.

Typically, however, the primary flow of polyolefin fluff 86 is to the extruder feed tank 110 via conduit 108. Downstream, rotary valve 114 may feed polyolefin fluff 116 to the extruder 56 which, in an aspect, may be a twin screw blending extruder. As will be appreciated by one of ordinary skill in the art, the fluff 116 from the extruder feed tank 110 may be metered to the extruder 56 with a variety of meters, such as smart flowmeter-type, master-feeder type, and so forth.

Extruder feed may include process stabilizers and additives, such as UV inhibitors, phenolics, phosphites, process aids, and peroxides, among others, which are added to the fluff 116 to impart desired characteristics to the polymer pellets 96. For example, one or more additives may be fed to the extruder 56 from an extruder feed hopper 118 through a connection 66 on the extruder 56.

An extruder receives the feed, including the fluff 116 and whatever additives have been added. In general, the extruder 56 may melt, blend, homogenize, and pump the polyolefin polymer and additives through a pelletizer 120, which may include a screen pack and heated die head 122. The pelletizer 120 has pelletizer knife blades (e.g., under water) which may cut the polyolefin melt extruded through the die into pellets. The pellets are typically quenched by water 124 and may travel in a pellet-water slurry 126 from the pelletizer 120 to a pellet dewatering dryer 128. The dryer 128 may separate the free water and then dry the remaining surface water from the pellets by centrifugal force. The dried pellets 130 may discharge, for example, onto a scalping screen 132 which removes oversized and undersized pellets from on-specification pellets 134.

Water 124 may be supplied to the pelletizer 120 from a water tank 136 via a centrifugal pump 138 and cooler 140, for example, a shell and tube heat exchanger. Water 142 removed from the pellet dryer 128 may return to the water tank 136. The polyolefin pellets 134 exiting the scalping screen 132 may fall by gravity through a rotary valve 144 into, for example, a dense-phase pneumatic conveying line 146 for transport to pellet silos 148.

The pellet silos 148 may include storage tanks, blenders, off-specification storage tanks, and so on. In the illustrated aspect, the blower package 150 provides nitrogen and/or air 152 to convey the pellets 134 via conveying line 146 to the pellet silos 148. Polyolefin pellets 96 may be loaded into railcars 154, hopper cars, trucks, tote bins, bags, and so on. Pellets 96 may be loaded into railcars 154, for example, using a gravity type, air assisted, multiple-spout, loading system. Such a system may allow the railcars 154 to be automatically loaded at a rate higher than the polymerization and extrusion production rate. Thus, extra "time" generated by the higher loadout rates may be exploited to provide time to move the railcars 154 after filling, and to spot the next empty railcar 154.

In the case of polyethylene, pellets 96 shipped to customers 100 may include low-density polyethylene (LDPE), linear low-density polyethylene (LLDPE), medium-density polyethylene (MDPE), high-density polyethylene (HDPE), and enhanced polyethylene. Further, the pellets 96 may include blends of these resins, such as the polyolefin resins of the present techniques. The contents of each railcar 154 or each hopper car can be associated with and tracked using a lot number. As used herein, the term "lot number" refers to an identification number that corresponds to data including time of production, product specification, product characterization, product properties, product type, on or off specification designation, and other data. In some aspects, the method described herein may be used to predict a time a particular lot disposed in a railcar number reaches a destination or destinations, such as a customer or other locations along the way.

Figure 3:
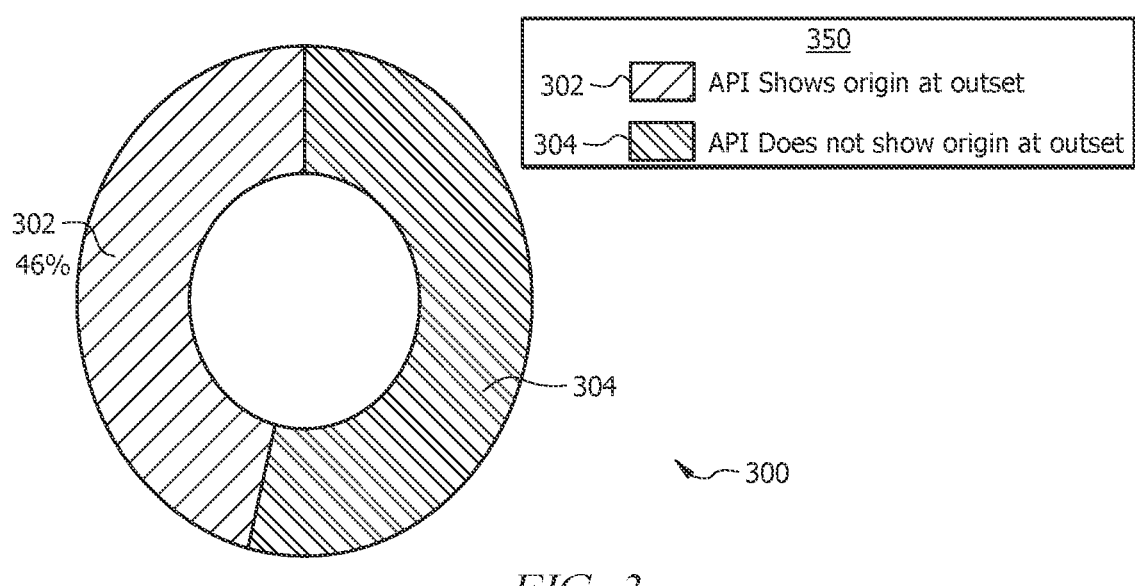
FIG. 3 is a chart illustrating characteristics of a railcar tracking application programming interface (API) according to an aspect.

Turning now to FIG. 3, a chart 300 illustrating characteristics of a traditional, contemporary railcar tracking application programming interface (API) according to an aspect is described. In aspects herein, each exemplar railcar tracking API is provided by a commercial rail carrier (also called a "railroad company"). The chart 300 is based on a dataset

350, which includes the results of a plurality of observed real-world railcar tracking API calls. The dataset 350 includes approximately 230,000 observed closed inbound empty trips. In some aspects, a "closed inbound empty trip" refers to a trip that has been completed by a railcar. In a closed inbound empty trip, the railcar has arrived at a final destination after leaving an origin point (e.g., a depot yard). When the railcar returns to the origin point, the railcar will be inbound to the origin point and empty, the contents of the railcar having been offloaded at the final destination. In some aspects herein, "closed" and "completed" are synonymous terms.

The dataset 350 is sortable into at least first API call results 302, wherein each result includes a predicted railcar ETA at a trip outset, and second API call results 304, wherein each result does not include a predicted railcar ETA at a trip outset. In some aspects, the predicted railcar ETA at a trip outset refers to the estimated inbound time of arrival of the railcar back to an origin yard after completing a round trip journey (or, the "inbound ETA"). In some aspects, the dataset 350 includes historical data in the form of previous ETA predictions used in a production environment.

In particular, in the non-limiting exemplary dataset 350, the first API call results 302 include only forty-six percent of the dataset 350, and the second API call results 304 include a majority of the dataset 350 at fifty-four percent.

As shown above, the first API call results 302, wherein each result includes a predicted railcar ETA at a trip outset, are not always available. In addition, a rail carrier making available such an API cannot provide an ETA to the final destination of the railcar unless the rail carrier is the delivery railway (that is, the rail carrier that delivers the railcar to the final destination). This is because the railcar tracking API associated with each rail carrier is only able to produce information possessed by the API associated rail carrier and possesses no information about other segments of the trip in which the railcar is travels along more than one carrier, switchers, or other lines not owned by the API associated rail carrier. Thus, for the dataset 350 and substantially similar real-world datasets, the traditional, contemporary railcar tracking API is wholly inoperable to predict a railcar return ETA from the point of origin of the railcar or at any arbitrary point along the journey of the railcar, as is enabled by the present disclosure.

Figure 4:
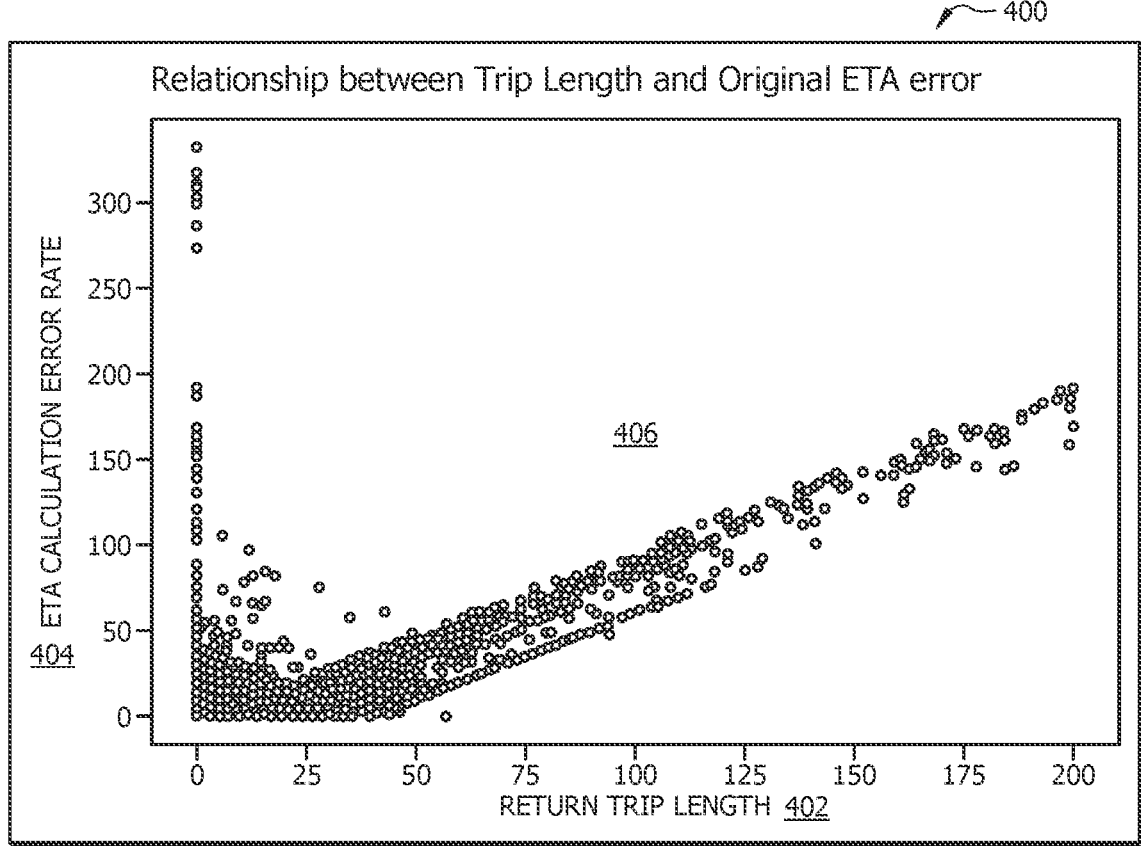
FIG. 4 is a data plot illustrating a relationship between a trip length measured in days and an estimated time of arrival (ETA) calculation error rate of a traditional, contemporary railcar tracking service provider according to an aspect.

Turning now to FIG. 4, a data plot 400 illustrating a relationship between a trip length 402 measured in days and an estimated time of arrival (ETA) calculation error rate 404 of a traditional, contemporary railcar tracking service provider according to an aspect is described. In some aspects, the traditional, contemporary railcar tracking service provider uses radio frequency identification (RFID) tags on a railcar and RFID tag readers at set locations (e.g., CLM locations) to track the railcar. While this inferior technique tracks an entire trip of the railcar, the predicted ETA of the railcar using this methodology is merely a crude average based on, for example, a historical average for similar prior trips.

The trip length 402 of a railcar is the length of time taken by the railcar to complete a trip from an origin point to a destination point. The ETA calculation error rate 404, calculated by comparison to the trip length 402, is the error rate of a predicted ETA provided by the traditional, contemporary railcar tracking service provider. The ETA calculation error rate 404 is presented in absolute value form. Here, "absolute value" refers to the number of days by which the calculated ETA varied from the actual trip length 402. As a non-limiting example, if an ETA prediction for a trip is seven days, and the trip actually completes in five days, the difference is two days. Thus, the absolute error is two days. An absolute value is used to avoid negative error rates. The data plot 400 is based on a dataset 406 and is presented as a scatter plot. Thus, for each of the return trip lengths 402, there exists the associated ETA calculation error rate 404.

In some aspects, the trip length 402 refers to the length of a trip of a railcar back to an origin yard after completing a round trip journey (e.g., the inbound ETA of FIG. 3). For some trips, the trip length 402 is shown as zero. In such trips, the trip took less than one full day (that is, less than twenty-four hours) to be completed. For the dataset 406, the ETA calculation error rate 404 is demonstrated to rise in a substantially linear fashion, becoming increasingly unreliable and unusable as the trip length 402 increases.

Figure 5A:
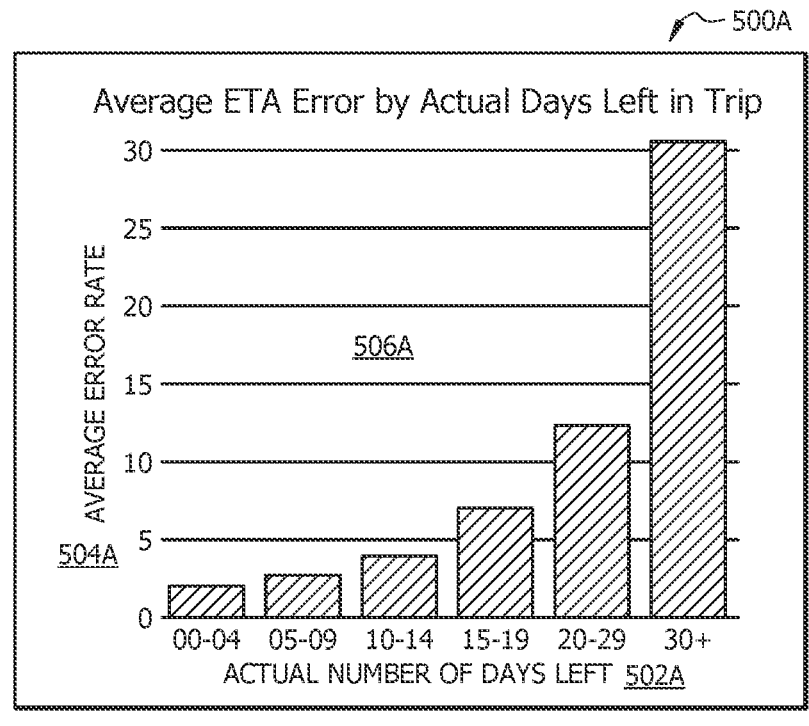
FIG. 5A is a first graph illustrating a relationship between an actual number of days left in a railcar trip and an average error rate of a traditional, contemporary railcar tracking service provider ETA prediction according to an aspect.
Figure 5B:
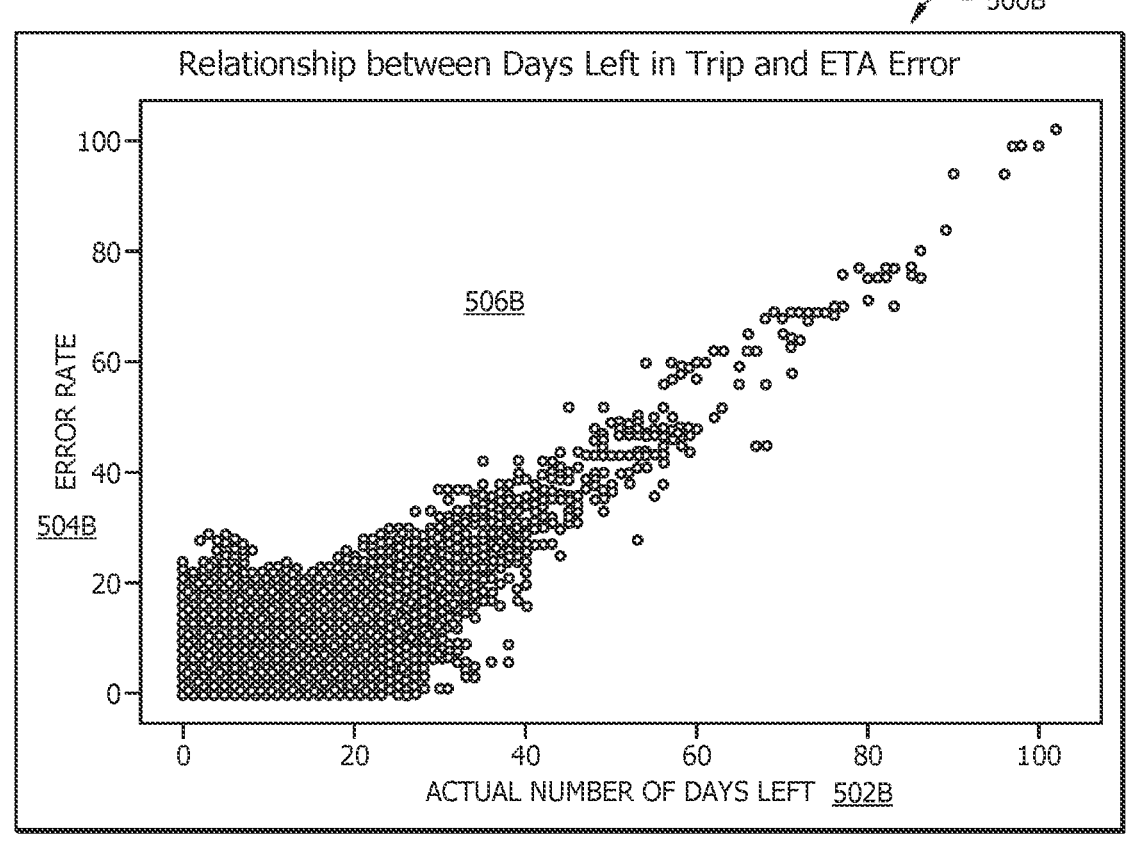
FIG. 5B is a second graph illustrating a relationship between an actual number of days left in a railcar trip and an error rate of a traditional, contemporary railcar tracking service provider ETA prediction according to an aspect.

FIGS. 5A and 5B below discuss, among other aspects, an experimental results set containing pairs of (1) an actual number of days left in a rail trip of an actual railcar, and (2) a predicted ETA (that is, a predicted number of days left in the trip of the same actual railcar) according to a traditional, contemporary railcar tracking service provider. FIGS. 5A and 5B illustrate the statistically significant relationships between variables that are depicted; the actual values of the datapoints shown are not intended to, and should not be understood to, restrict the scope of this disclosure in any way. The statistically significant relationships between variables that are depicted herein remain substantially the same no matter the values of the variables recorded during such experiments.

Further, in FIGS. 5A and 5B, "absolute value" has the same meaning as described in the discussion of FIG. 4, above.

Turning now to FIG. 5A, a first graph 500A illustrating a first relationship 506A between an actual number of days left in a railcar trip 502A and an average error rate 504A of a traditional, contemporary railcar tracking service provider ETA prediction according to an aspect is described. The average error rate 504A is presented as an absolute value. The actual number of days left in a railcar trip 502A is the length of a trip of an actual railcar (that is, how long the railcar spent to complete a journey from an origin point to a destination point). Here, the actual number of days left in a railcar trip 502A is presented as a collection of time ranges (e.g., zero to four days, five to nine days, ten to fourteen days, etc.). Thus, each depicted average error rate 504A is an average associated with an increasingly large window of time. As shown, even when averaged, the average error rate 504A rises sharply and in a substantially faster than linear fashion, becoming increasingly unreliable and unusable as the actual number of days left in a railcar trip 502A increases. As the length of such a railcar trip is substantially fixed once the origin and the destination are set, such traditional, contemporary average ETA prediction methodologies are clearly demonstrated to be impracticable for railcar trips over a certain length.

Turning now to FIG. 5B, a second graph 500B illustrating a second relationship 506B between an actual number of days left in a railcar trip 502B and an error rate 504B of a traditional, contemporary railcar tracking service provider ETA prediction according to an aspect is described. The error rate 504B is presented as an absolute value. The actual number of days left in a railcar trip 504A is the length of a trip of an actual railcar (that is, how long the railcar spent to complete a journey from an origin point to a destination point). The depicted relationship is presented as a scatter plot. The second graph 500B demonstrates substantially the same trend as the first graph 500A: as the actual number of days left in a railcar trip 502B increase, so too does the error rate 504B rise sharply and in a substantially linear fashion, becoming increasingly unreliable and unusable as the actual number of days left in a railcar trip 502A increases. As the length of such a railcar trip is substantially fixed once the origin and destination are set, such traditional, contemporary average ETA prediction methodologies are clearly demonstrated to be impracticable for railcar trips over a certain length.

Figure 6:
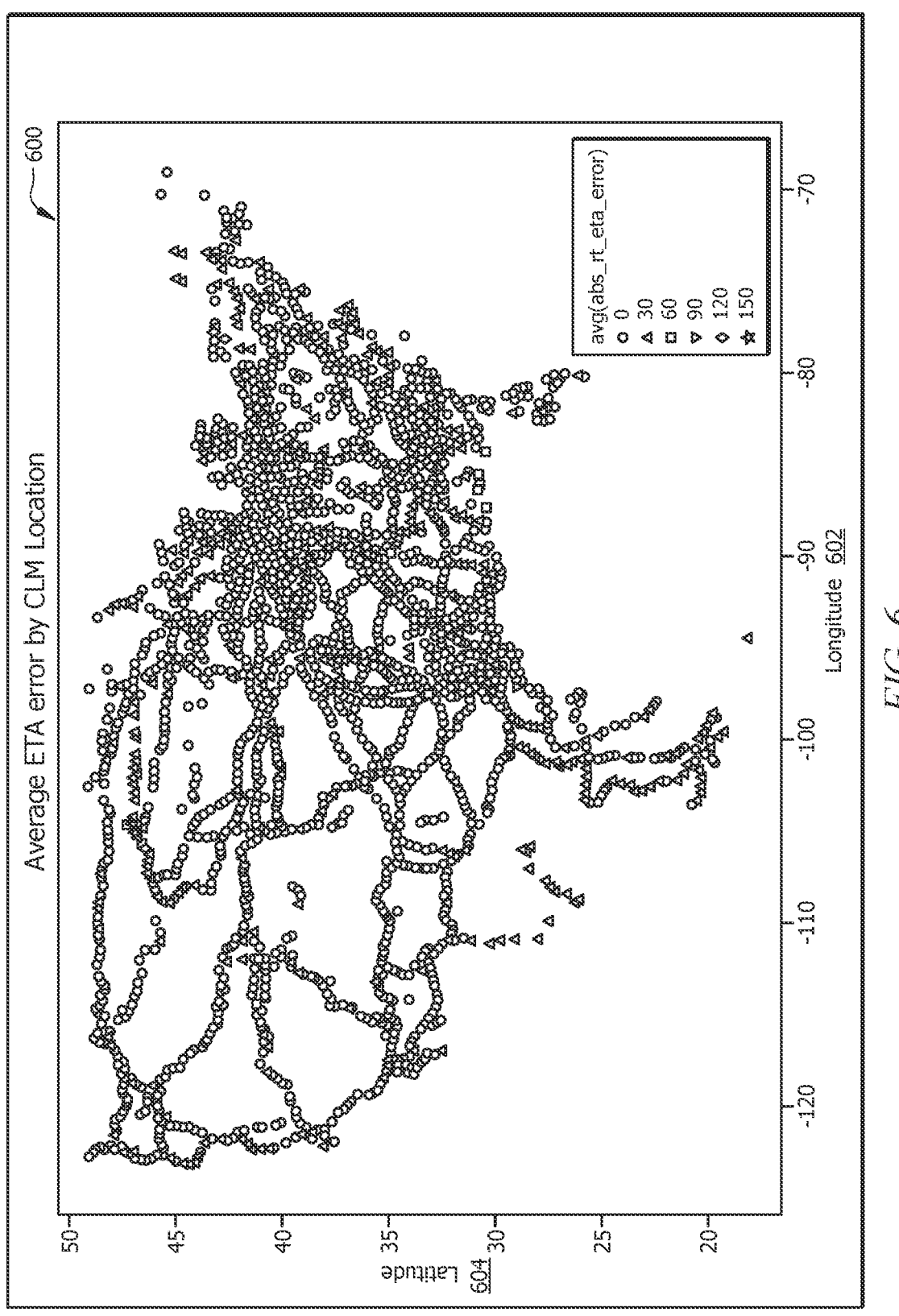
FIG. 6 is a map illustrating a relationship between traditional, contemporary average ETA error rates and car location message (CLM) locations according to an aspect.
Figure 7:
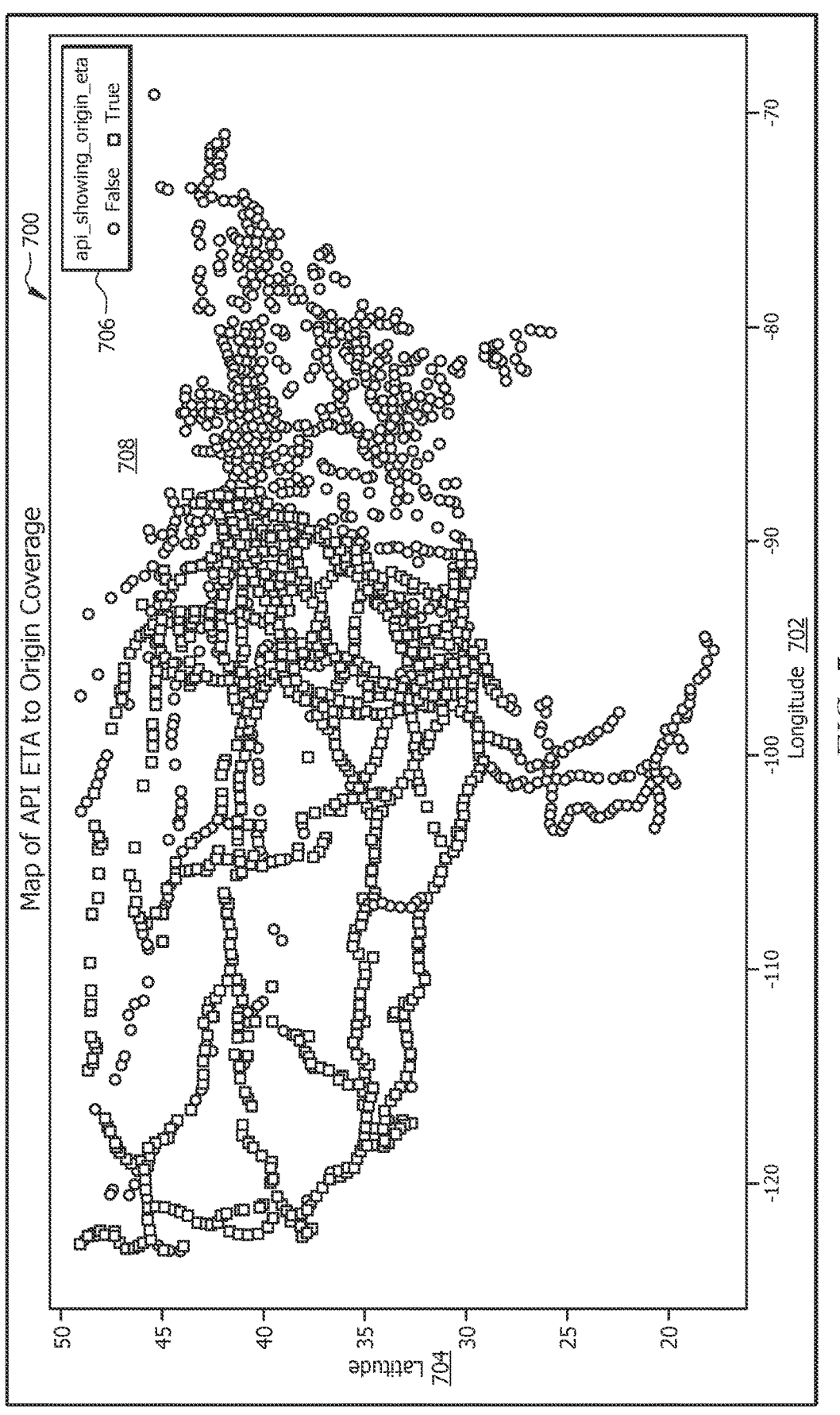
FIG. 7 is a map illustrating a relationship between a traditional, contemporary API ETA and an origin coverage according to an aspect.

FIGS. 6 and 7 recontextualize data from previous figures as points on maps of the United States in order to provide additional context regarding the interaction between geography and prediction error rates inherent to contemporary, traditional ETA prediction techniques. The systems and methods disclosed herein for using a trained ML model configured to determine an ETA of a railcar do not suffer reductions in accuracy based on geographical considerations, as discussed and demonstrated elsewhere herein.

Turning now to FIG. 6, a map 600 illustrates a relationship between traditional, contemporary railcar tracking service provider average ETA error rates and car location message (CLM) locations according to an aspect. This relationship is illustrated as a map plot 608. Points on the map plot 608 are locatable using a longitude 602 and a latitude 604, and a traditional, contemporary railcar tracking service provider average ETA error rate 606 is provided. The map plot 608 recontextualizes the data plot 400 of FIG. 4, and except as otherwise noted, the explanation and analysis applicable to the data plot 400 herein is applicable to the map plot 608.

Turning now to FIG. 7, a map 700 illustrates a relationship between a traditional, contemporary API ETA and an origin coverage according to an aspect. This relationship is illustrated as a map plot 708. Points on the map plot 708 are locatable using a longitude 702 and a latitude 704. The ability of a traditional, contemporary railcar tracking API to predict a railcar ETA at trip is indicated by a legend 706. The map plot 708 recontextualizes the chart 300 of FIG. 3, and except as otherwise noted, the explanation and analysis applicable to the chart 300 herein is applicable to the map plot 708.

Turning now to FIG. 8, a record 800 from training data for an ML model configured to determine an ETA of a railcar according to an aspect is described. In some aspects, a plurality of the records 800, combined, are a non-limiting implementation of the training data created at operation 1110 of the process 1100 used to train an ML model configured to determine an ETA of a railcar, as described elsewhere herein. In some such aspects, the training data contains over one million data points. In other aspects, there is neither a fixed minimum floor nor a maximum ceiling on how many data points are contained within the training data.

The record 800 is provided only as an exemplary illustration. The record 800 is not intended to and does not set any fixed limitations beyond those expressly stated herein on the content of actual training data used to train implementations of the ML model disclosed herein. The record 800 comprises a plurality of datapoints 802, including but not limited to the datapoints 8002-8200. In some aspects, each of the plurality of datapoints 802 have at least the meanings indicated in FIGS. 20A-20C.

Turning now to FIG. 9, a table illustrates features 900 of an ML model configured to determine an ETA of a railcar according to an aspect. In some aspects, the ML model has been trained by an implementation of the process 1100 described elsewhere herein. Each of the features 900 comprises a feature name 902, a feature type 904, and a source

906. The feature type is one of numeric or categorical, and indicates the data type of the feature 900. The source 906 of each of the features 900 indicates whether the feature is available to be retrieved from an existing data source or in the alternative is calculable or determinable from other data. The features 900 include but are not limited to a last ten CLM average train speeds 908, a latitude 910, a distance to a destination 912, a longitude 914, an average train speed 916, a last 25 CLM average train speeds 918, a days to determined ETA 920 (the ETA being determined by a contemporary, traditional predictive process), a days into trip indicator 922, a railroad 924, a CLM event 926, a season 928, and a sight code 930. In some aspects, the railroad 924 is an ownership entity (e.g., a rail carrier, a railway, a rail company, etc.) that owns the section of rail over which the railcar is traveling at a time associated with the features 900.

Figure 10:
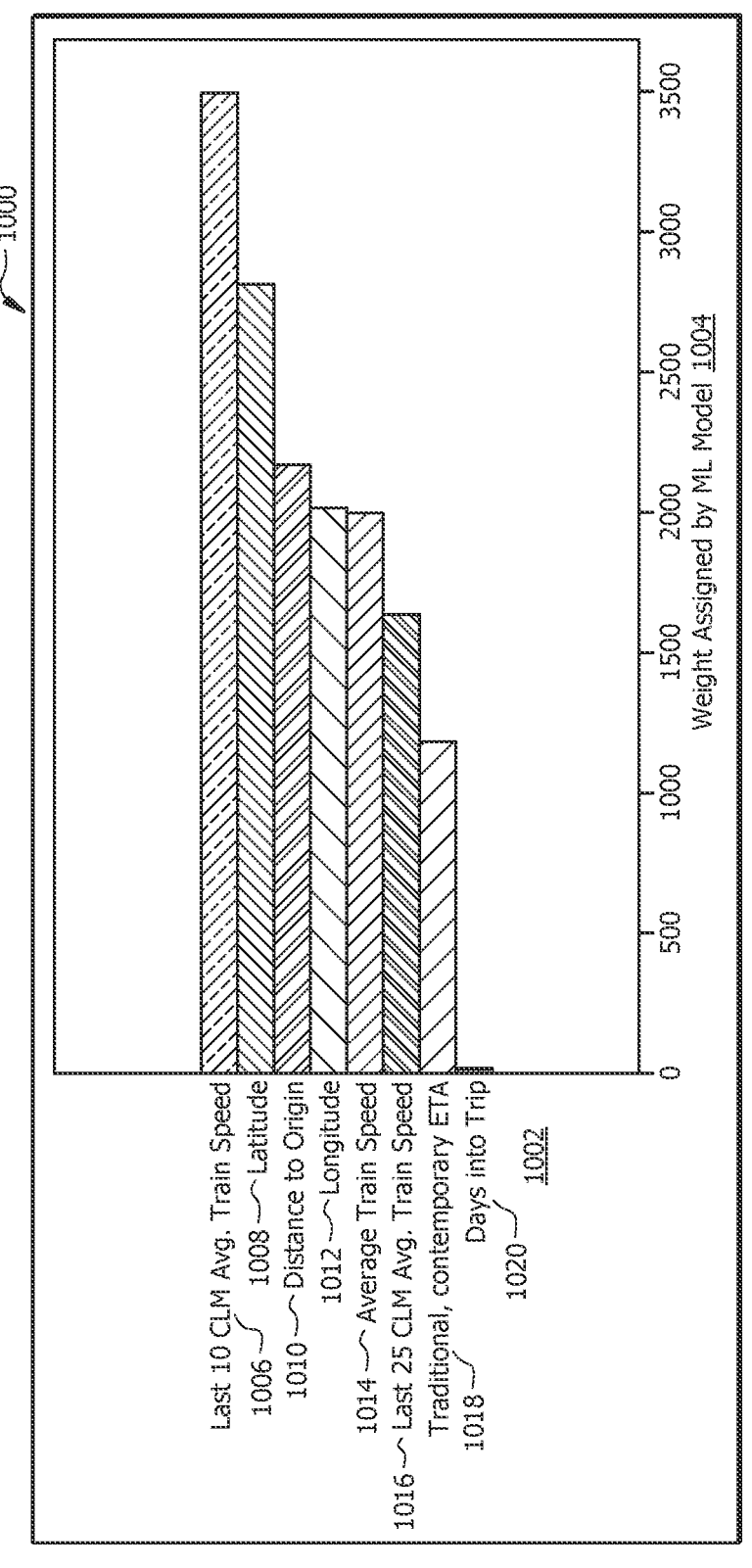
FIG. 10 is a bar graph illustrating exemplary weights of features in an implementation of an ML model configured to determine an ETA of a railcar.

Turning now to FIG. 10, a bar graph 1000 illustrating exemplary weights of features in an implementation of an ML model configured to determine an ETA of a railcar is disclosed. In some aspects, the ML model has been trained using the process 1100 described elsewhere herein. The bar graph 1000 is provided for exemplary purposes only. Other implementations of the ML model have different weights of the features without losing any predictive accuracy. Weighted features 1002 are plotted against a weight value 1004, and include a last ten CLM average train speed 1006, a latitude 1008, a distance to origin 1010, a longitude 1012, an average train speed 1014, a last twenty-five CLM average train speed 1016, a days to traditional, contemporary ETA 1018, and a days into trip indicator 1020.

Figure 11A:
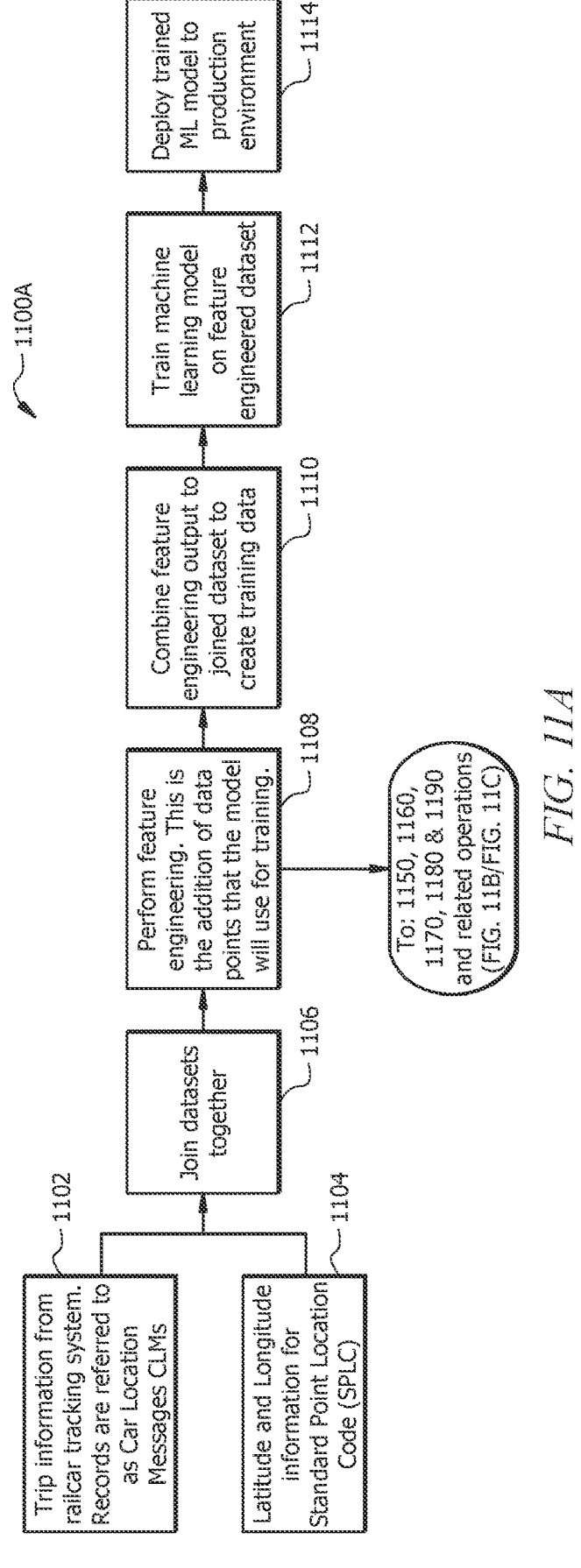
Figure 11C:
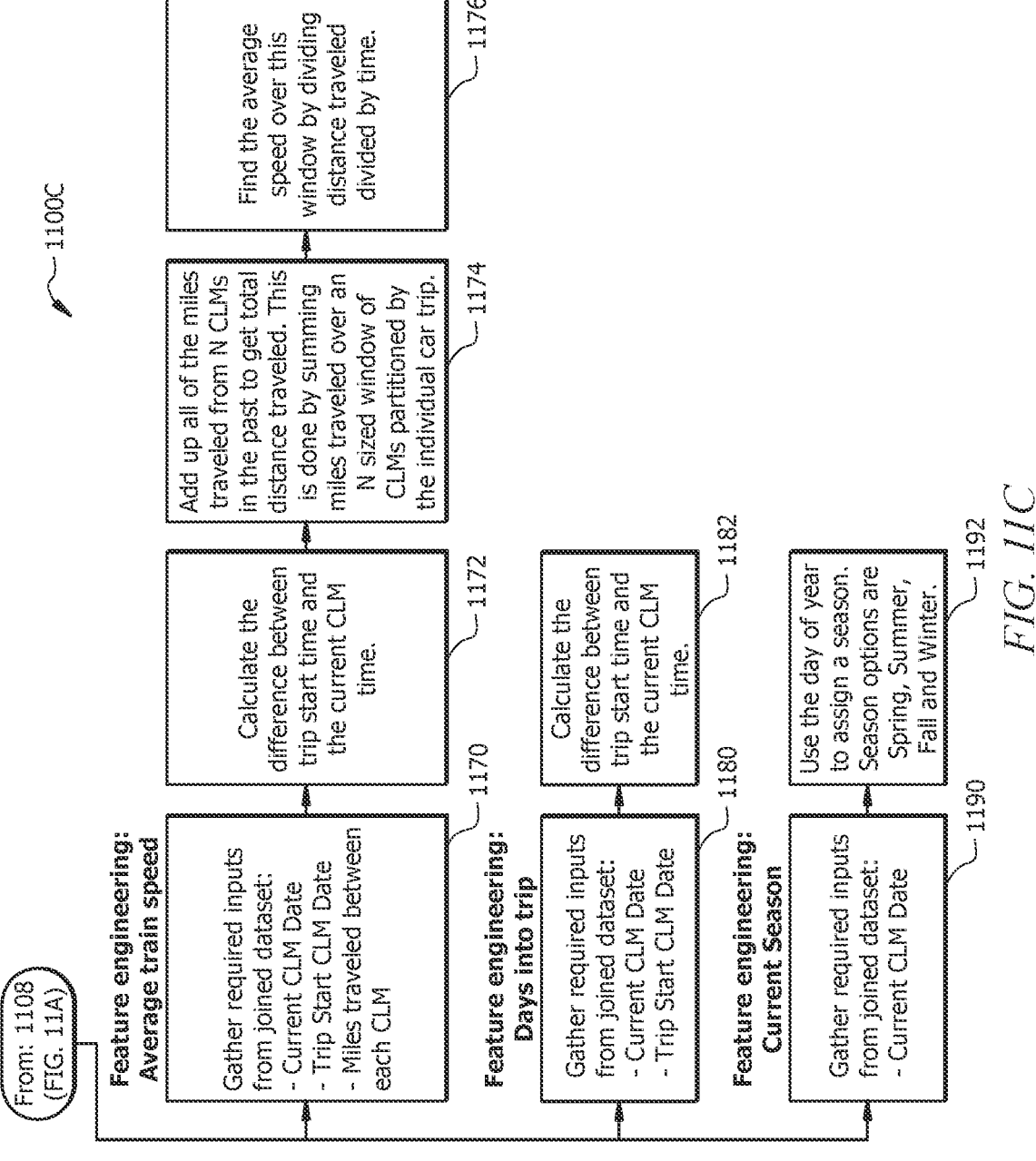

Turning now to FIGS. 11A-11C, a process flow diagram 1100 (the "process 1100") illustrating a training process for an ML model configured to determine an ETA of a railcar according to an aspect is described. FIGS. 11A-11C collectively illustrate a single process flow that has been split across multiple drawing sheets to enhance legibility. At operation 1102, a trip information dataset is retrieved from a railcar tracking system. The trip information dataset comprises records in the form of car location messages (CLMs). At operation 1104, a latitude and longitude information dataset (or the "geographical information dataset" herein) associated with a plurality of standard point location codes (SPLCs, or singularly SPLC) for at least one rail carrier is retrieved from a geographical information source. In some aspects, each SPLC is a distinct SPLC assigned to each rail station registered by a rail carrier. Thus, the plurality of SPLCs represents each rail station passed by the railcar during the trip. Additional corresponding geographical data (e.g., latitude and longitude) is sourced elsewhere, as discussed above.

At operation 1106, the trip information dataset and the geographical information dataset are joined together to create a joined dataset.

At operation 1108, feature engineering ("FE") is performed to generate additional datapoints used to train the ML model. These additional datapoints are based at least in part on the trip information dataset and the geographical information dataset. The FE of operation 1108 is a multi-step sub-process that is explained in further detail below. Generally, both feature selection in the previous operations as well as FE are concerned with determining how far a railcar needs to travel to reach a destination, and how fast the railcar is traveling (as well as how the speed or velocity of the railcar changes over time). To that end, FE generates both an average speed during an entire trip, and, as explained further herein, average speed over specific segments of the entire trip.

Operations 1110, 1112, and 1114 as described below occur after the FE of operation 1108 is completed.

At operation 1110, a feature engineering output ("FE output") is combined with the joined dataset to create training data. At operation 1112, the ML model is trained on the training data. At operation 1114, the trained model is configured for production use.

Feature Engineering. The FE of operation 1108 includes operations 1150 through 1192, described immediately below. Some aspects perform all the operations 1150 through 1192 as a sub-process of operation 1108. Other aspects perform all the operations 1150 through 1192 as well as additional operations as a sub-process of operation 1108. FE is performed for each record in the joined dataset, and thus adds the additional datapoints discussed herein to each record in the joined dataset. FE comprises five sub-processes, by which new model features are engineered from the contents of the training set. The discussion of these components below is presented in terms of operations on a single record (a "training record") in the joined dataset. In aspects, during operation 1108 all of the operations 1150 through 1190 are performed on each record in the joined dataset to generate the FE output: Determining a haversine distance, beginning at operation 1150; determining train speed over a window (a speed window), beginning at operation 1160; determining an average train speed, beginning at operation 1170; determining a number of days into a current trip, beginning at operation 1180; and determining the current season, beginning at operation 1190.

In aspects herein, the haversine distance is an as-the-crow-flies, shortest straight line measurement of distance from a point A to a point B. Using the haversine distance with the disclosed ML model when determining how far a railcar has traveled and at what speed is advantageous at least because an actual travel distance (e.g., miles of railcar track traversed) for a trip from point A to point B is variable due to unforeseen and unpredictable outside factors (including but not limited to detours, how various rail carriers choose to move railcars, etc.). Utilizing the haversine distance provides the ML model with consistent, reliable information on the railcar trip in both the training and production phases.

Feature Engineering: Haversine Distance. At operation 1150, a current railcar latitude, current railcar longitude, destination latitude, and destination longitude are read from the training record. Additionally, the radius of the earth in a specified unit of measure is calculated. At operation 1152, a distance ("drlat") in radians is calculated between the destination latitude and the current railcar latitude. At operation 1154, a distance ("drlong") in radians is calculated between the destination longitude and the current railcar longitude.

At operation 1156, value A is calculated using the equation below. Variable curlat is the current railcar latitude in radians.

$$A = \left[\operatorname{sine}\left(\frac{drlat}{2}\right)\right]^2 + \operatorname{cosine}(curlat) * \operatorname{cosine}(drlat) * \left[\operatorname{sine}\left(\frac{drlon}{2}\right)\right]^2$$

At operation 1158, value B is calculated using the equation below.

$$B = 2 * \operatorname{arctangent}\left(\sqrt{(\text{value } A)}, \sqrt{[(\text{value } A) - 1]}\right)$$

At operation 1159, the haversine distance calculation is completed by multiplying B by the radius of the earth in the specified unit of measurement to get the haversine distance.

Feature Engineering: Speed Window. At operation 1160, a current CLM date, a trip state CLM date, and an amount of miles traveled between each CLM are read from the training record. At operation 1162, a date of N CLMs in the past is calculated by taking the minimum date of an N-sized window of CLMs partitioned by the individual car trip. In some aspects, the individual car trip includes the time and events between the railcar leaving the point of origin and arriving at the destination. Once arrival at the destination occurs, the individual car trip is completed. In some such aspects, a completed individual car trip is referred to as a closed individual car trip. A time difference is calculated between the date of N CLMs in the past and the current CLM date. At operation 1164, the entire distance travelled (specified in a determined unit of measurement) from N CLMs in the past is computed to determine the total distance travelled. This includes summing the distance travelled over an N sized window of CLMs partitioned by the individual car trip. At operation 1166, an average speed over this window is determined by dividing the distance travelled by the difference between the current CLM date and the trip start CLM date.

Feature Engineering: Average Train Speed. At operation 1170, the current CLM date, the trip start CLM date, and the distance travelled between each CLM (specified in a determined unit of measurement) are read from the training record. At operation 1172, a difference is calculated between the trip start time and the current CLM time. At operation 1174, the distance travelled from the start of the trip to the current CLM is calculated. This includes summing the distance travelled between each CLM partitioned by the individual car trip. At operation 1176, the total distance travelled is divided by a difference between the trip start CLM date and the current CLM time.

Feature Engineering: Days into a Current Trip. At operation 1180, the current CLM date and the trip start CLM date are read from the training record. At operation 1182, a difference is calculated between the current CLM date and the trip start CLM date.

Feature Engineering: Current Season. At operation 1190, the current CLM date is read from the training record. The current CLM date includes at least a current day of a calendar year. At operation 1192, the current date is used to assign a season. The season is one of winter, spring, summer, or fall.

Figure 12:
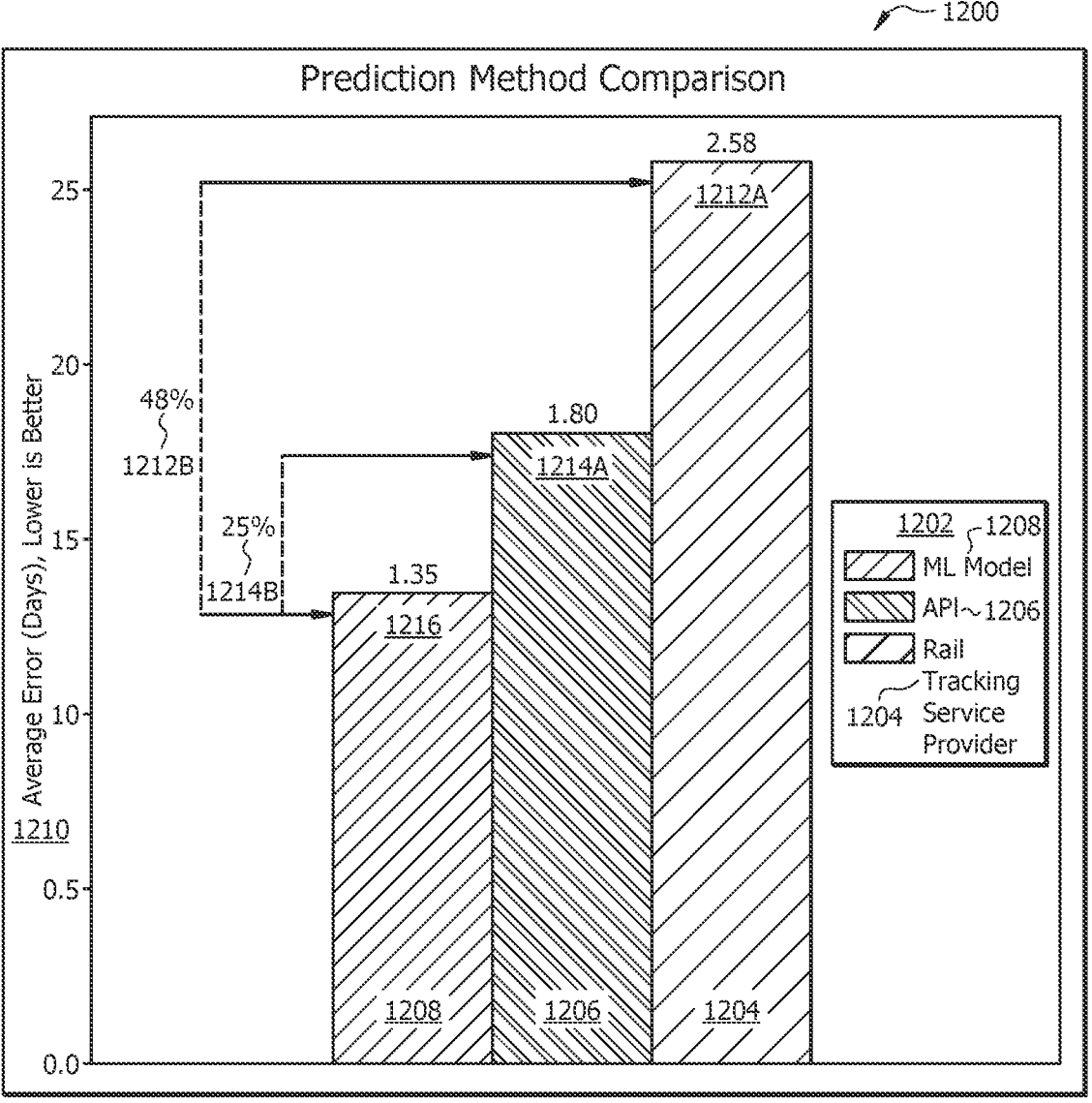
FIG. 12 is a graph illustrating experimental results of an ETA determination method comparison for inbound railcar trips according to an aspect.

Turning now to FIG. 12, a graph 1200 (the "comparison 1200") illustrating experimental results 1202 of an ETA determination method comparison for inbound railcar trips according to an aspect is described. In some aspects, the experimental results 1202 include over 1,000,000 real-world historical data points from Jan. 1, 2022 to Jun. 30, 2022, used to compare different ETA prediction methods. Comparison was done between the methods prediction and the actual value (e.g., the actual time to complete a railcar trip).

The comparison 1200 plots an ETA average error rate 1210, measured in days, for a traditional, contemporary railcar tracking service provider ETA prediction 1204, a traditional, contemporary railway provider proprietary rail tracking API 1206, and an ML model 1208 that has been trained according to, e.g., the process 1100.

Relative improvements in performance are shown by shorter ETA average error rates 1210. The traditional, contemporary railcar tracking service provider ETA prediction 1204 exhibits an average error rate 1212A of 2.58 days. This is forty-eight percent (see 1212B) less accurate than the ML model 1208. The traditional, contemporary railcar tracking API 1206 exhibits an average error rate 1214A of 1.80 days. This is twenty-five percent (see 1214B) less accurate than the ML model 1208. The ML model 1208 exhibits an average error rate 1216 of merely 1.35 days. Thus, in the experimental results 1202, the superior performance of the ML model 1208 over the traditional, contemporary railcar tracking service provider ETA prediction 1204 and the traditional, contemporary railcar tracking API 1206 is stark and unambiguous.

The experimental results 1202 are provided as an illustration of the performance of an implementation of the ML model disclosed herein. The experimental results 1202 shown here are not intended to, and do not, set any fixed performance limitations on the disclosed ML model. That is, the comparison 1200 does not preclude an alternative implementation of the ML model 1208 exhibiting a superior performance as measured by the ETA average error rate 1210 versus another traditional, contemporary railcar tracking service provider ETA prediction or another traditional, contemporary railway provider proprietary tracking API than is depicted here.

Figure 13:
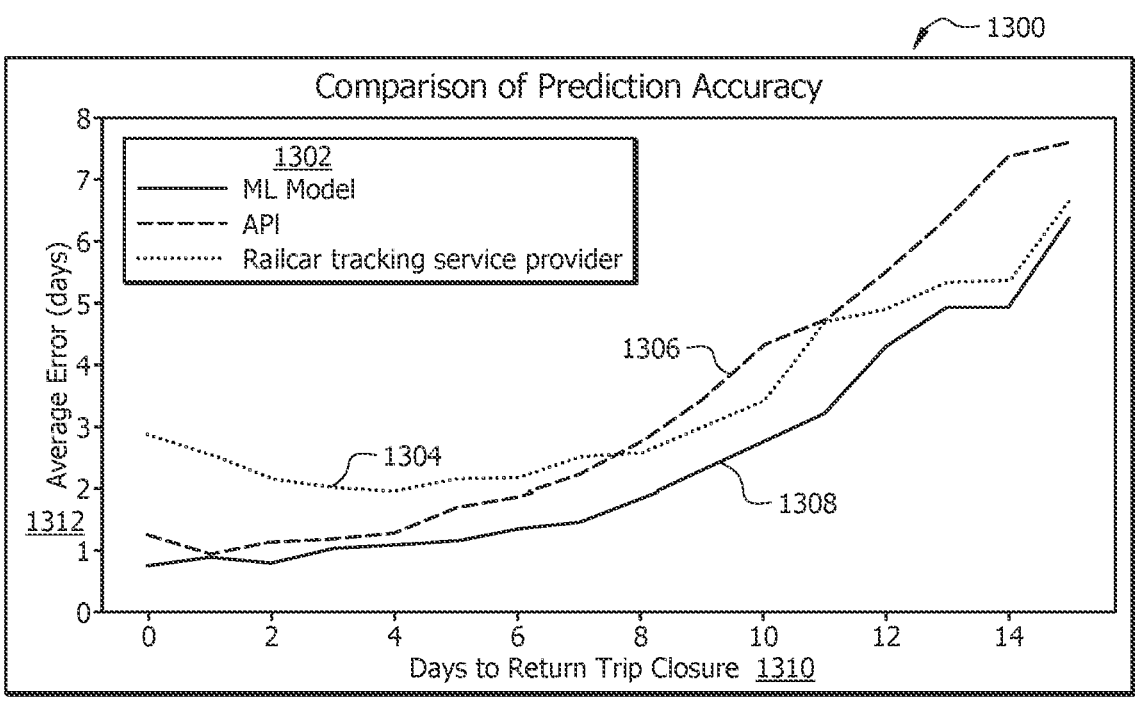
FIG. 13 is a graph illustrating experimental results of an ETA determination method comparison for outbound railcar trips according to an aspect.

Turning now to FIG. 13, a graph 1300 (the "comparison 1300") illustrating experimental results 1302 of an ETA determination method comparison for outbound railcar trips according to an aspect is described. The comparison 1300 plots a delta in an ETA average error rate 1312, measured in days, against a measure of days to return trip closure 1310. That is, the comparison 1300 demonstrates the change in the ETA average error rate 1312 as a railcar trip draws nearer to completion. Read right-to-left, the comparison 1300 shows that the average error rate 1312 decreases as the railcar trip draws nearer to completion. Thus, when comparing ETA determination methods, the method with superior performance is the method which demonstrates the swiftest decrease in the average error rate 1312.

The comparison 1300 illustrates the experimental results 1302 for a traditional, contemporary railcar tracking service provider ETA prediction 1304, a traditional, contemporary railway provider proprietary rail tracking API 1306, and an ML model 1308 that has been trained according to, e.g., the process 1100. The comparison 1300 illustrates that no matter a value of measure of days to return trip closure 1310, the ML model 1308, according to the experimental results 1302, always outperforms the traditional, contemporary railcar tracking service provider ETA prediction 1304 and the traditional, contemporary railway provider proprietary rail tracking API 1306 as measured by the average error rate 1312.

As displayed in the comparison 1300, the methodology having superior performance shows the lowest average error rate 1312 for the associated days to return trip closure 1310. For example, in the experimental results 1302, when the days to return trip closure 1310 is four (as shown on the x-axis), the average error rate 1312 for the traditional, contemporary railcar tracking service provider ETA prediction 1304 is approximately 2.1 days, the average error rate 1312 for the traditional, contemporary railway provider proprietary rail tracking API 1306 is approximately 1.4 days, and the average error rate 1312 for the ML model 1308 is approximately 1.2 days.

Thus, in the experimental results 1302, the consistently superior performance of the ML model 1308 over the traditional, contemporary railcar tracking service provider ETA prediction 1304 and the traditional, contemporary railcar tracking API 1306, no matter the amount of the days to return trip closure 1310, is stark and unambiguous.

The experimental results 1302 are provided as an illustration of the performance of an implementation of the ML model disclosed herein. The experimental results 1302 shown here are not intended to, and do not, set any fixed performance limitations on the disclosed and claimed ML model. That is, the comparison 1300 does not preclude an alternative implementation of the ML model 1308 exhibiting a superior performance as measured by the relationship between the measure of days to return trip closure 1310 and the ETA average error rate 1312 versus another traditional, contemporary railcar tracking service provider ETA prediction or another traditional, contemporary railway provider proprietary tracking API than is depicted here.

The table below illustrates a non-limiting example of the experimental results 1302 used to graph the comparison 1300. The example table is provided for illustrative purposes only and is not intended to limit the scope of this disclosure in any way. Other examples of the experimental results 1302 have different numerical values than what is shown below, but share the properties and other characteristics discussed above, herein.

1404A, 1404B, and 1404C and an ETA prediction 1406A, 1406B, and 1406C by an ML model that has been trained according to, e.g., the process 1100. Each of the comparison 1400A, the comparison 1400B, and the comparison 1400C illustrate that the ETA prediction 1406A, 1406B, and 1406C by the ML model has a significantly higher accuracy than the traditional, contemporary railcar tracking service provider ETA prediction 1404A, 1404B, and 1404C. The ETA prediction by the trained ML model 1406A, 1406B, and 1406C consistently delivers an ETA prediction representing the best fit to the actual observed real-world days to trip close 1408A, 1408B, and 1408C, often exactly matching the actual observed real-world days to trip close 1408A, 1408B, and 1408C, as shown by the ETA prediction by the trained ML model 1406A, 1406B, and 1406C exactly matching the actual number of days to trip close 1410A, 1410B, and 1410C several times. Thus, in the experimental results 1402A, 1402B, and 1402C, the superior performance of the ETA prediction 1406A, 1406B, and 1406C over the traditional, contemporary railcar tracking service provider ETA prediction 1404A, 1404B, and 1404C is stark and unambiguous.

| Days to Return Trip Closure 1310 | ML Model Prediction 1308 Average Error 1312 | API Prediction 1306 Average Error 1312 | Rail Tracking Service Provider Prediction 1304 Average Error 1312 | ML Model Prediction 1308 vs Rail Tracking Service Provider 1304: Percent Improvement | ML Model Prediction 1308 vs API Prediction 1306: Percent Improvement |
|---|---|---|---|---|---|
| 0 | 0.71 | 1.24 | 2.97 | 43% | 76% |
| 1 | 0.89 | 0.91 | 2.60 | 3% | 66% |
| 2 | 0.84 | 1.12 | 2.18 | 26% | 62% |
| 3 | 1.03 | 1.16 | 2.05 | 11% | 50% |
| 4 | 1.13 | 1.24 | 2.01 | 9% | 44% |
| 5 | 1.27 | 1.64 | 2.13 | 23% | 41% |
| 6 | 1.43 | 1.81 | 2.13 | 21% | 33% |
| 7 | 1.43 | 2.11 | 2.38 | 32% | 40% |
| 8 | 1.85 | 2.62 | 2.54 | 29% | 27% |
| 9 | 2.24 | 3.32 | 2.90 | 32% | 23% |
| 10 | 2.74 | 4.09 | 3.29 | 33% | 17% |
| 11 | 3.26 | 4.64 | 4.72 | 30% | 31% |
| 12 | 4.23 | 5.37 | 4.80 | 21% | 12% |
| 13 | 4.82 | 6.10 | 5.11 | 21% | 6% |
| 14 | 4.97 | 7.19 | 5.08 | 31% | 2% |
| 15 | 5.84 | 7.35 | 6.39 | 21% | 9% |

Figure 14A:
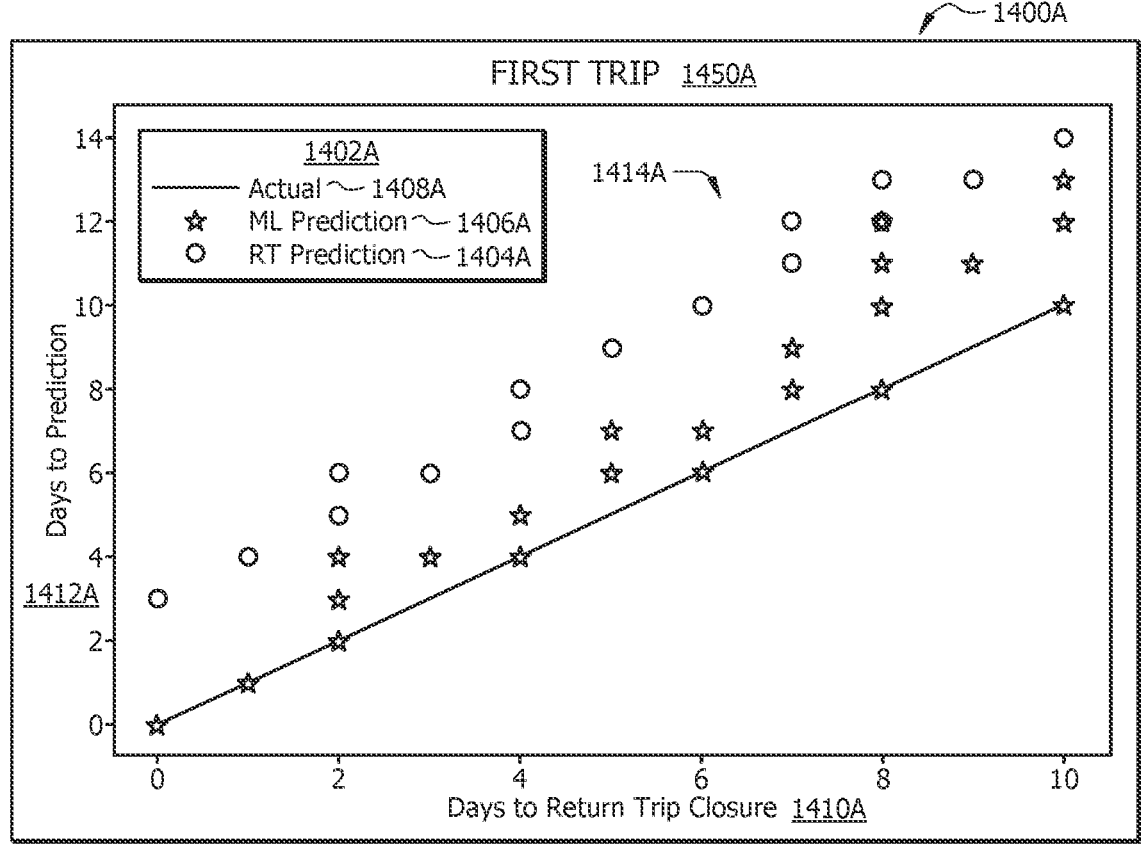
FIGS. 14A-C are data plots illustrating experimental results for an ETA determination method comparison from a departure yard to a destination according to an aspect.
Figure 14B:
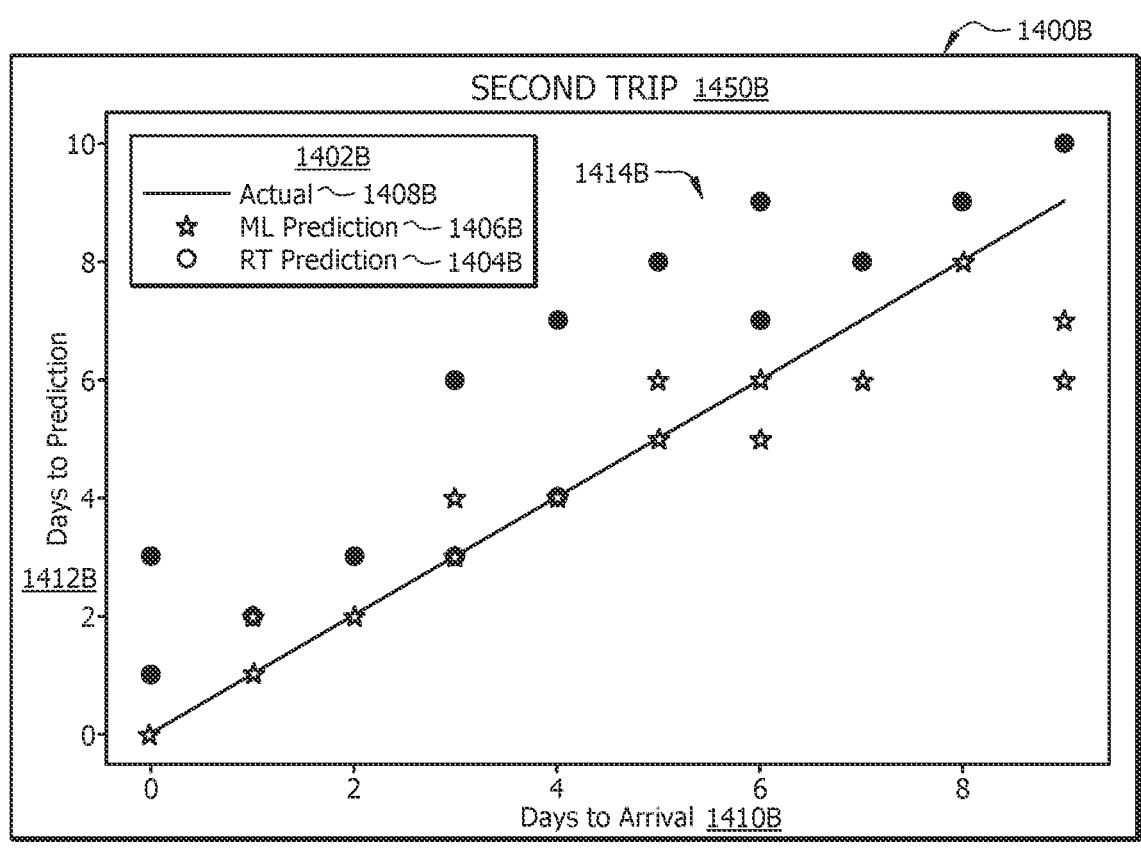
Figure 14C:
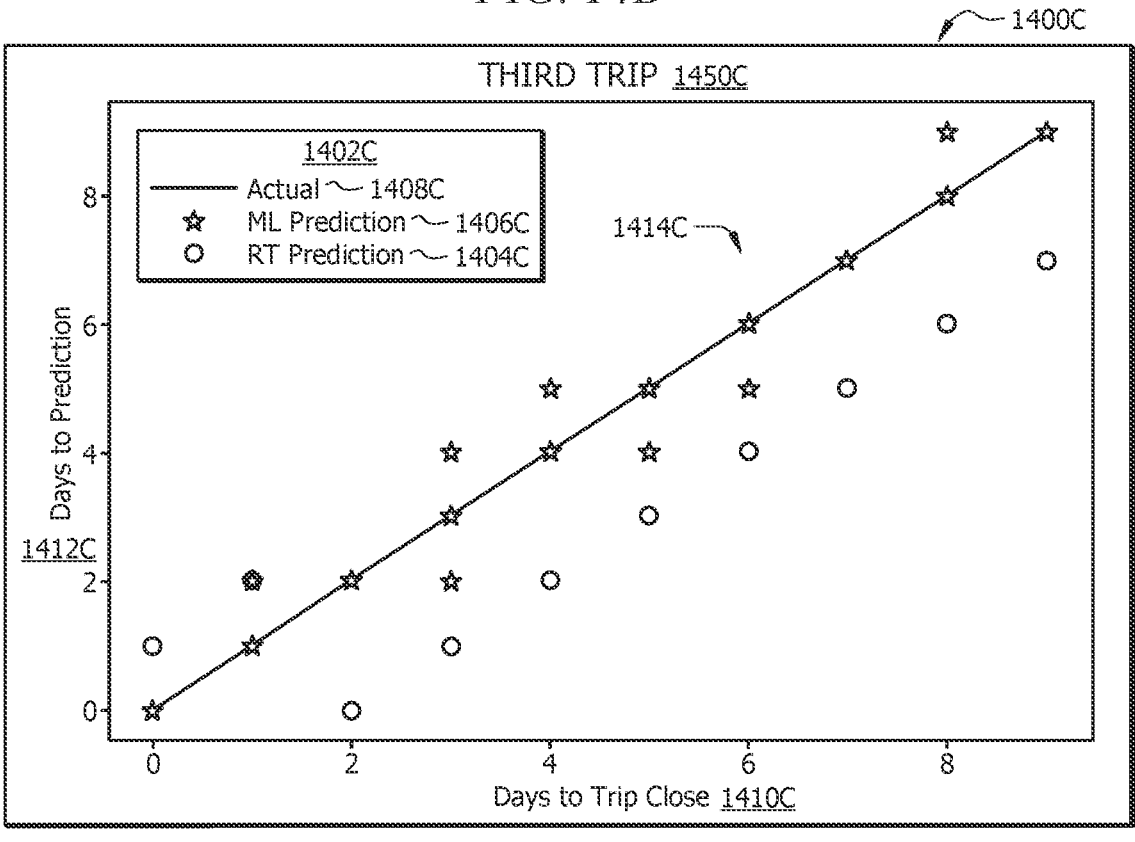

Turning now to FIGS. 14A-C, a data plot 1400A associated with a first trip 1450A, a data plot 1400B associated with a second trip 1450B, and a data plot 1400C associated with a third trip 1450C (respectively, the "comparison 1400A," "comparison 1400B," and "comparison 1400C") illustrating experimental results 1402A, 1402B, and 1402C for a determination method comparison from a departure yard to a destination are described according to an aspect. In some aspects, each of the first trip 1450A, the second trip 1450B, and the third trip 1450C represent a separate individual railcar trip. In each figure, an actual number of days to trip close 1410A, 1410B, and 1410C is plotted against a predicted number of days to a railcar arrival at a destination 1412A, 1412B, and 1412C, represented as a scatter plot wherein each datapoint 1414A, 1414B, and 1414C is a prediction made with a certain number of days to trip close remaining.

The experimental results 1402A, 1402B, and 1402C thus depict actual observed real-world days to trip close 1408A, 1408B, and 1408C in comparison to a traditional, contemporary railcar tracking service provider ETA prediction The experimental results 1402A, 1402B, and 1402C are provided as an illustration of the performance of an implementation of the ML model described and claimed herein. The experimental results 1402A, 1402B, and 1402C shown here are not intended to, and do not, set any fixed performance limitations on the disclosed and claimed ML model. That is, none of the comparisons 1400A, 1400B, and 1400C preclude an alternative implementation of the ML model exhibiting a superior performance as measured by the relationship between the measure of the actual observed real-world days to trip close 1408A, 1408B, and 1408C and the ETA prediction 1406A, 1406B, and 1406C versus another traditional, contemporary railcar tracking service provider ETA prediction than is depicted here.

Figure 15:
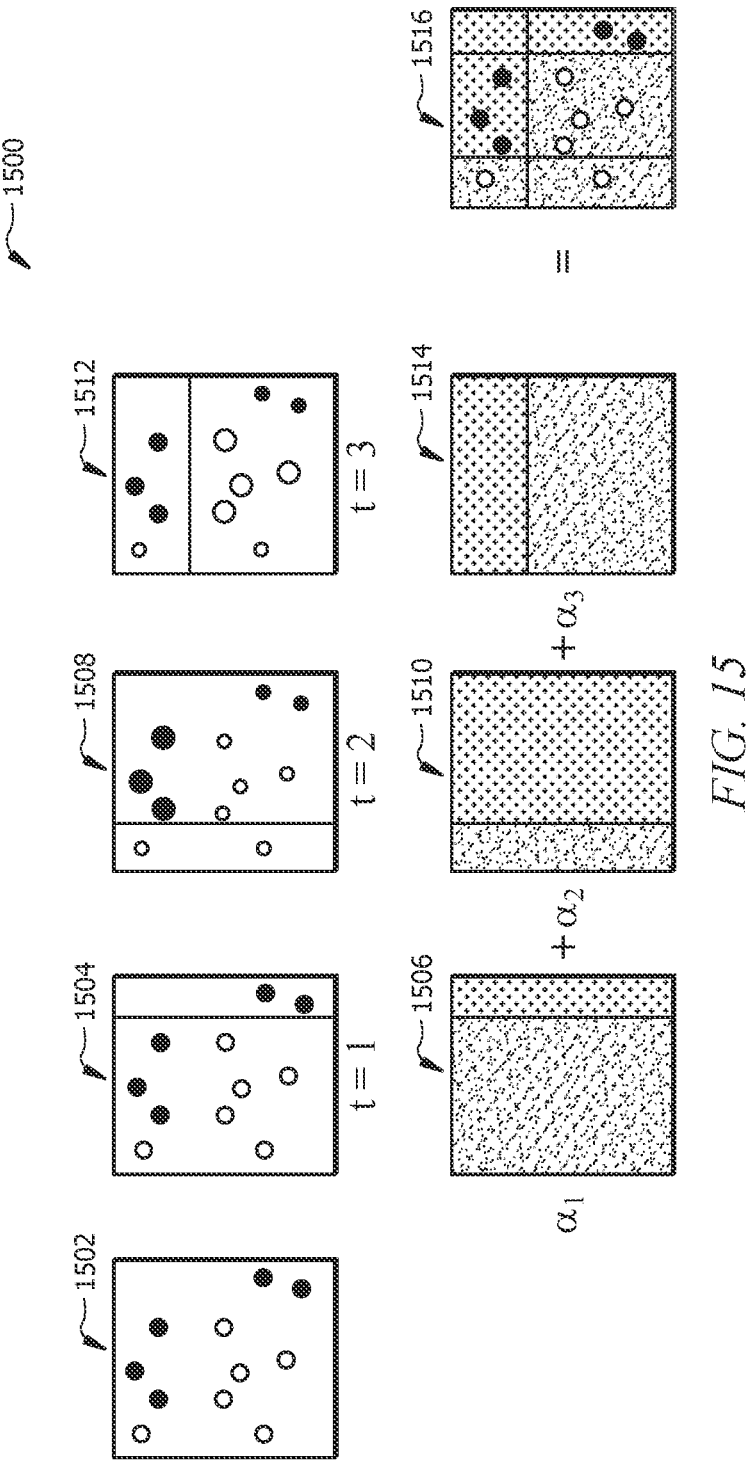
FIG. 15 is an illustration of a gradient boosting tree (GBT) machine learning process according to an aspect.

Turning now to FIG. 15, an illustration of a GBT machine learning process 1500 (the "GBT ML process 1500") is described according to an aspect. In some aspects, the GBT ML process 1500 utilizes gradient boosted regression trees. Notably, while the implementation of the GBT ML process 1500 depicted in FIG. 15 and described herein is operable with the aspects of this disclosure, this does not preclude the use of any alternative implementation of GBT ML processes or any other ML processes which are otherwise interoperable with the systems and methods described and claimed in this disclosure. In some aspects, the GBT ML process 1500 is trained and used as an ML model configured to determine an ETA of a railcar as described in accordance with the systems and methods disclosed herein. In some such aspects, the ML training of the GBT ML process 1500 functions at least as described in a non-limiting fashion below.

Gradient boosting as used in ML models is an ensemble learning technique used in both classifier-based and regression-based ML applications. Gradient boosting trees create an ensemble of decision trees sequentially; each tree corrects at least one error made by at least one previous tree. Gradient boosting tree-based ML models are a subset of gradient boosting ML models generally. At a high level, each tree slices the whole problem into a smaller problem, and tree outputs are combined at the end of the process to compose a full prediction.

GBT-based models are said to "boost" because a GBT implementation builds trees sequentially, and each tree corrects the errors of at least one of the previous trees. The "gradient" refers to minimization of the loss function (e.g., mean squared error for regression, or log loss for classification, etc.) by following the negative gradient of the loss function with respect to the predictions of the GBT-based model. Because GBT-based models are primarily concerned with residuals, a higher degree of robustness is achieved compared to models that are impacted by outliers in actual data points.

In the following paragraphs, a non-limiting example of how an implementation of the GBT ML process 1500 functions is described.

Initialization. GBT-based ML models based on the GBT ML process 1500 begin processing from an initial model 1502. In some aspects, the initial model 1502 is a mean regression; in other aspects, the initial model 1502 is a majority class (e.g., for a classifier). In some aspects, the initial model 1502 is referred to as the zeroth iteration.

Residual Calculation. Residuals (that is, the differences between actual values and the predictions of the current model) are calculated for each data point in a training set (e.g., the record 800 of FIG. 8). The residuals represent at least the errors that the initial model 1502 makes.

Building Trees. A first decision tree 1506 is fitted to the residuals at operation 1504. The first decision tree is configured to identify patterns in the residuals that the initial model 1502 is not handling with a desired degree of accuracy. In some aspects, the resultant decision tree is a shallow tree with a limited depth (e.g., a "weak learner" tree). In some aspects, the resultant tree is a regression tree for regression tasks. In other aspects, the resultant tree is a classification tree for classification tasks.

In some aspects, the first decision tree 1506 and each subsequent decision tree (e.g., a second decision tree 1510 and a third decision tree 1514) that collectively form the GBT-based ML model represent an ensemble of weak learners. In such aspects, each tree is simple and has little predictive power when acting alone. The ensemble of weak learners is able to leverage each tree to create a strong ML model with highly accurate predictive capabilities.

Learning Rate. During training, a learning rate is defined. In some aspects, this is a value between 0 and 1. The learning rate controls the contribution of each tree to the final ensemble. A learning rate tuned to at least one of the application space (e.g., the type of prediction or determination being made) or the training data assists in preventing overfitting and allows the GBT ML process 1500 to engage in gradual learning, which tends to train the GBT ML process 1500 to favor higher accuracy. In other aspects, in the alternative to controlling the learning rate, overfitting is prevented by at least one of imposing tree depth limits or minimum samples per leaf.

Update Model. At this stage of the GBT ML process 1500, the current iteration of the model (e.g., the initial model 1502 and successor iterations thereto) is updated at, for example, operation 1508 and operation 1512. Updating the model includes but is not limited to adding an output of the newly created tree (e.g., the first decision tree 1506, a second decision tree 1510, and successors thereto, including but not limited to a third decision tree 1514), scaled by the learning rate, to the predictions of the previous model iterations. Each such update reduces the residuals (e.g., the error rate) of the ML model being trained; with each update, the ML model becomes a weighted sum of the previous model iterations and the newly created tree.

Repetition Cycle. The portion of the GBT ML process 1500 including the Residual Calculation though the Update Model task above are repeated (see, e.g., generation of the second decision tree 1510 and the third decision tree 1514) for a predefined number of iterations or until an alternative stop condition occurs or is otherwise satisfied. As explained herein, each new tree generated during the repetition cycle reduces the residuals (that is, reduces the errors) made by the previous ensemble.

Final Ensemble. A final ensemble 1516 is a final prediction. The final prediction is the sum of predictions from all the trees in the ensemble.

In some aspects, the GBT ML process 1500 described above is integrated into the disclosed systems and methods using a custom or bespoke implementation. In other aspects, a publicly-available or otherwise multi-purpose or general purpose GBT implementation is used. These include but are not limited to XGBoost, LightGBM, SparkML GBT, and AdaBoost.

Turning now to FIG. 16, a flow chart illustrating a method 1600 for training a machine learning (ML) model to determine an estimated time of arrival (ETA) of a railcar to a depot yard and generate a fleet readiness alert according to an aspect is described. In some aspects, the ML model comprises a gradient boosting tree (GBT). The method 1600 comprises, at operation 1602, collecting, from a railcar tracking system, a trip information associated with the railcar; at operation 1604, collecting, from a rail station data source, coordinates of at least one rail station, each of the at least one rail stations being associated with a rail carrier; and at operation 1606, creating a joined dataset by combining the trip information and the coordinates. In some aspects, the trip information comprises at least one car location message (CLM) and the coordinates comprise at least one latitude and longitude pair, each of the at least one latitude and longitude pairs associated with a standard point location code (SPLC) of a rail station, the rail station being registered to the rail carrier.

The method 1600 further comprises, at operation 1608, performing feature engineering (FE) on the joined dataset to create a feature engineered output, the feature engineered output comprising a plurality of engineered features. In some aspects, performing FE to create the feature engineered output further comprises performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

In some such aspects, determining the haversine distance further comprises: collecting, from the joined dataset, a current railcar latitude, a current railcar longitude, a destination latitude, and a destination longitude; determining a radius of a current planet in a first unit of measurement; calculating a first distance in a second unit of measurement between the destination latitude and the current railcar latitude; calculating a second distance in the second unit of measurement between the destination longitude the current railcar longitude; using the first distance and the second distance, calculating the haversine distance using a haversine distance formula; and assigning to the feature engineered output the calculated haversine distance. In some such aspects, optionally the first unit of measurement is miles; and the second unit of measurement is radians.

In some such aspects, determining the train speed over the speed window comprises: collecting, from the joined dataset, a current CLM date, a trip start CLM date, and a plurality of miles travelled between each CLM; calculating a date of an earliest past CLM in the speed window; calculating a time difference between the date of the earliest past CLM in the speed window and the current CLM date; calculating a total distance travelled between the earliest past CLM and the current CLM date; calculating the train speed over the speed window as an average speed by dividing the total distance travelled by the time difference; and assigning, to the feature engineered output, the train speed over the speed window. Optionally, the speed window has a size that is less than or equal to the preset number of CLMs.

In some such aspects, determining an average train speed further comprises: collecting, from the joined dataset, a current CLM date, a trip start CLM date, and a distance travelled between each CLM; calculating a difference between the trip start CLM date and the current CLM date; calculating a sum distance between the trip start CLM and the current CLM; calculating the average train speed by dividing the sum distance by the difference between the trip start CLM date and the current CLM date; and assigning, to the feature engineered output, the average train speed.

In some such aspects, determining the number of days into the train trip further comprises: collecting, from the joined dataset, a current CLM date; collecting, from the joined dataset, a trip start CLM date; calculating a difference between the trip start CLM date and the current CLM date; and assigning to the feature engineered output, based on the difference between the trip start CLM date and the current CLM date, the number of days into the train trip.

In some such aspects, determining the season further comprises: collecting, from the joined dataset, a current CLM date; determining, from the CLM date, a day of a year; and assigning to the feature engineered output, based on the day of the year, the season, the assigned season being one of: a winter, a spring, a summer, and a fall.

At operation 1610, the method 1600 further comprises combining the joined dataset with the feature engineered output to create training data for the ML model; and at operation 1612, training the ML model on the training data to create the trained ML model. The method 1600 additionally comprises, at operation 1614, validating the trained ML model using a validation set to provide a validated ML model; and wherein validating comprises: inputting the validation set to the trained ML model at operation 1616, determining the ETA of the railcar at operation 1618, generating, from the trained ML model and the validation set, the fleet readiness alert based on the determined ETA of the railcar and indicating at least a usability status of a fleet of railcars at the depot yard within a fixed time at operation 1620, and verifying an acceptable accuracy of the fleet readiness alert based on at least one historical ETA in the validation set at operation 1622. Note that FIG. 16 depicts the operations involved in validating the trained model (operations 1614-1622) in a dotted-line box for readability; the dotted-line box has no other substantive meaning unless otherwise stated herein.

Turning now to FIG. 17, a flow chart illustrating a method 1700 for using a trained machine learning (ML) model to determine an estimated time of arrival (ETA) of a railcar to a depot yard and to generate a fleet readiness alert according to an aspect is described. In some aspects, the ML model comprises a gradient boosting tree (GBT). The method 1700 comprises, at operation 1702, collecting, from a railcar tracking system, a trip information associated with the railcar; at operation 1704, collecting, from a rail station data source, coordinates of at least one rail station, each of the at least one rail stations being associated with a rail carrier; and at operation 1706, creating a joined dataset by combining the trip information and the coordinates. The method 1700 further comprises, at operation 1708, performing feature engineering (FE) on the joined dataset to create a feature engineered output, the feature engineered output comprising a plurality of engineered features. In some aspects, performing FE to create the feature engineered output further comprises performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

The method 1700 additionally comprises, at operation 1710, combining the joined dataset with the feature engineered output to create ML model feature inputs for the ML model. In some aspects, the ML model feature inputs further comprise at least: a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

The method 1700 additionally comprises, at operation 1712, activating the trained ML model. The trained ML model is configured to at least: accept the ML model feature inputs as an input to the ML model; determine the ETA of the railcar; and generate the fleet readiness alert. The fleet readiness alert is based on the determined ETA of the railcar and indicates at least a usability status of a fleet of railcars at the depot yard within a fixed time.

Note that FIG. 17 depicts the operations involved in activating and using the trained model (operations 1712-1718) in a dotted-line box for readability; the dotted-line box has no other substantive meaning unless otherwise stated herein.

Turning now to FIG. 18, a block diagram illustrating a system 1800 using a trained machine learning (ML) model 1820 to determine an estimated time of arrival (ETA) 1822 of a railcar 1880 to a depot yard 1870 and to generate a fleet readiness alert 1824 according to an aspect is described. In some aspects, the ML model 1820 comprises a gradient boosting tree. The system 1800 comprises a railway access system 1850. The railway access system 1850 includes at least one train 1860 configured to access at least one rail carrier 1890. The railcar 1880 is configured to mechanically couple to a train 1860 of the at least one trains 1860. The railway access system 1850 is configured to transport the railcar 1880 between the depot yard 1870 and a destination 1872. A data acquisition subsystem 1840 is communicatively coupled to a railcar tracking system 1830 and a rail station data source 1832. The data acquisition subsystem 1840 is further coupled to a data storage subsystem 1842. The system 1800 further includes a fleet readiness alert generator 1802 configured to monitor the railcar 1880. The fleet readiness alert generator 1802 comprises a processor 1804 and a non-transitory memory 1806 and is further configured to perform operations. The operations comprise collecting by the data acquisition subsystem 1840, from the railcar tracking system 1830, a trip information 1808 associated with the railcar 1880; storing the trip information 1808 in the data storage subsystem 1842; collecting by the data acquisition subsystem 1840, from the rail station data source 1832, coordinates of at least one rail station 1892, each of the at least one rail stations 1892 being associated with a rail carrier 1890 of the at least one rail carriers 1890; storing the coordinates 1810 in the data storage subsystem 1842; and creating a joined dataset 1812 by combining the trip information 1808 and the coordinates 1810.

The operations further comprise performing feature engineering (FE) on the joined dataset 1812 to create a feature engineered output 1814. The feature engineered output comprises a plurality of engineered features. In some aspects, performing FE to create the feature engineered output further comprises performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

The operations additionally comprise combining the joined dataset 1812 with the feature engineered output 1814 to create ML model feature inputs 1818 for the trained ML model 1820 and activating the trained ML model 1820. In some aspects, the model feature inputs 1818 further comprise at least: a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

The trained ML model 1820 is configured to at least: accept the ML model feature inputs 1818 as an input to the trained ML model 1820; determine the ETA 1822 of the railcar 1880; and generate the fleet readiness alert 1824. The fleet readiness alert 1824 is based on the determined ETA 1822 of the railcar and indicates at least a usability status of a fleet of railcars 1880 at the depot yard 1870 within a fixed time. In some aspects, the system 1800 displays to a user, by way of a user interface subsystem 1844, the fleet readiness alert 1824.

Figure 19:
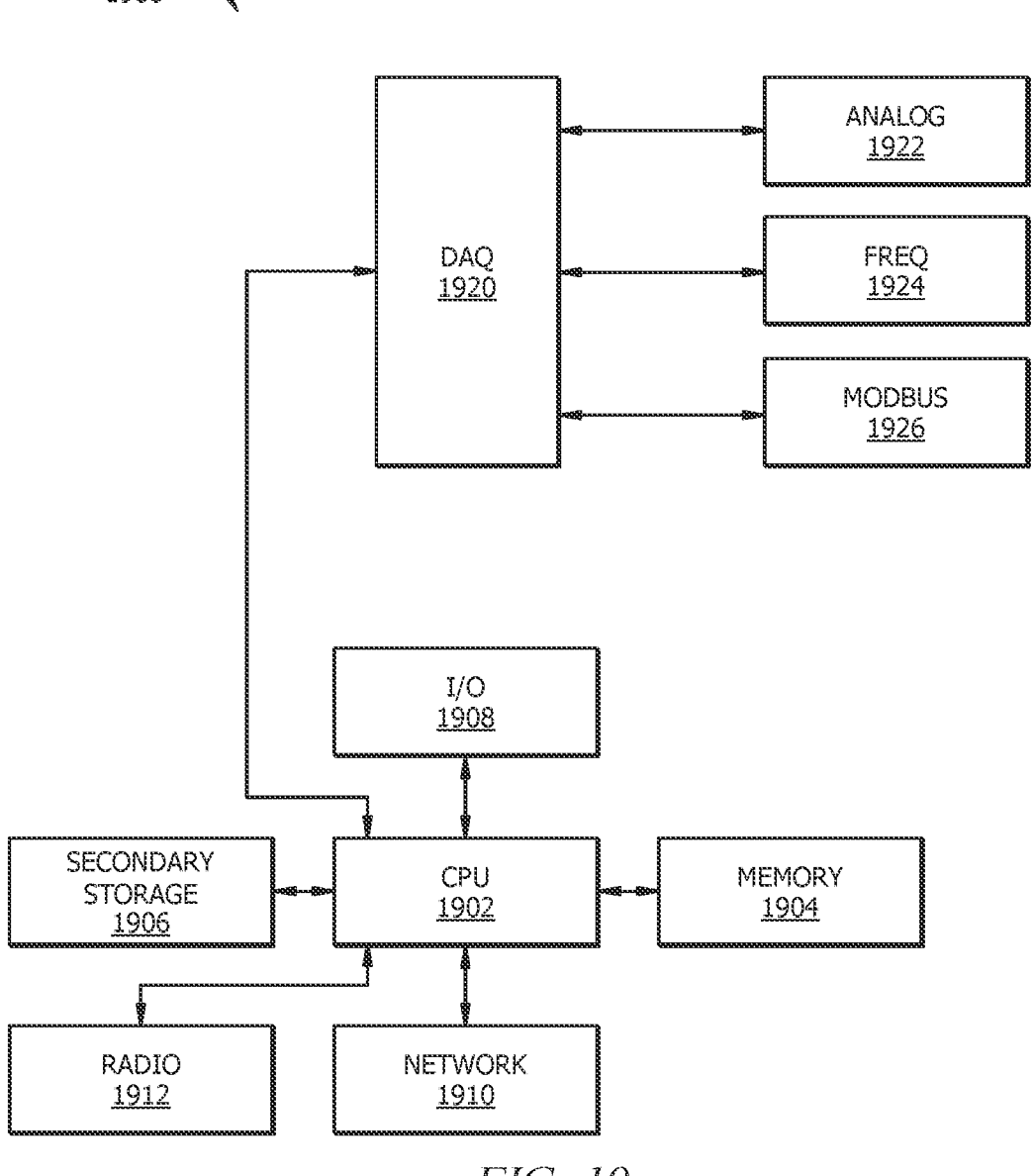
FIG. 19 is a block diagram illustrating a computer system according to an aspect of the disclosure and suitable for implementing one or more aspects of the disclosure.

Turning now to FIG. 19, a computer system 1900 according to an aspect of the disclosure is described. In some aspects, the computer system 1900 is integrated within or communicatively coupled to the manufacturing system 68 of FIG. 1. In some aspects, the computer system 1900 is at least one of (or at least a component of) the system 1800 or any other computer system or combination of computer systems configured to execute the method 1600 or the method 1700 described herein. In particular, in some aspects, the term "computer system 1900" is interchangeable with the term "fleet readiness alert generator 1802" of FIG. 18. In some aspects, the computer system 1900 is communicatively connected to aspects of at least the system 1800 as disclosed herein.

Some aspects of the computer system 1900 are suitable for implementing one or more aspects of a remote computer system, for example, a cloud computing system, a virtual network function (VNF) on a network slice of a cloud computing platform, and a plurality of user devices.

The computer system 1900 includes one or more processors 1902 (each also referred to as a "central processor unit," "central processing unit," or CPU) that is in communication with a memory 1904, a secondary storage 1906, input/output devices 1908, and network devices 1910. Some aspects of the computer system 1900 continuously monitor the state of the input devices and change the state of the output devices based on a plurality of programmed instructions. In some aspects, the programmed instructions comprise one or more applications retrieved from the memory 1904 for executing by the processor 1902 in the non-transitory memory 1904 within the memory 1904. In some aspects, the input/output devices 1908 comprise a Human Machine Interface with a display screen and the ability to receive conventional inputs from a user such as push button, touch screen, keyboard, mouse, or any other such device or element that a user utilizes to input a command to the computer system 1900. In some aspects, the secondary storage 1906 comprises at least one of a solid-state memory, a hard drive, or any other type of memory suitable for data storage. In some such aspects, the secondary storage 1906 additionally optionally comprises at least one of removable memory storage devices such as solid-state memory or removable memory media such as magnetic media and optical media (including without limitation compact discs (CDs), digital versatile discs (DVDs), blu-ray (BD) discs, magneto-optical (MO) discs, etc.).

The computer system 1900 is configured to communicate with various networks utilizing the network devices 1910. In some aspects, the various networks comprise wired networks utilizing at least one of, e.g., twisted-pair ethernet, direct attach cable (DAC cable), or fiber optic communications equipment, or any other type of wired networking equipment with substantially similar performance characteristics. In other aspects, the various networks comprise at short range wireless networks such as Wi-Fi (i.e., the IEEE 802.11 family of standards), Bluetooth, or other low power wireless signals such as ZigBee, Z-Wave, 6LoWPan, Thread, and Wi-Fi HaLow, or any other type of wireless networking equipment with substantially similar performance characteristics. In yet other aspects, the various networks comprise a combination of wired networks and wireless networks as described above. Some aspects of the computer system 1900 include a long-range radio transceiver 1902 for communicating with mobile network providers.

In some aspects, the computer system 1900 comprises a data acquisition (DAQ) card 1920 for communication with one or more sensors. In some such aspects, the DAQ card 1920 is a standalone system with a microprocessor, memory, and one or more applications executing in memory. In some aspects, the DAQ card 1920, as illustrated, is at least one of a card or a device within the computer system 1900. In some aspects, the DAQ card 1920 is combined with the input/output device 1908. In some aspects, the DAQ card 1920 receives one or more analog inputs 1922, one or more frequency inputs 1924, and one or more modbus inputs 1926. For example, the analog input 1922 may include a volume sensor, e.g., a tank level sensor. In some examples, the frequency input 1924 includes a flow meter, i.e., a fluid system flowrate sensor. In some examples, the modbus input 1926 includes a pressure transducer. In some aspects, the DAQ card 1920 converts the signals received via the analog input 1922, the frequency input 1924, and the modbus input 1926 into the corresponding sensor data. For example, some aspects of the DAQ card 1920 converts a frequency input 1924 from the flowrate sensor into flow rate data measured in gallons per minute (GPM).

The systems and methods disclosed herein are advantageously employable in an inventory distribution system for certain products, and specifically in training, and using, an ML model to predict the ETA of a railcar integrated into an inventory distribution system for such products.

Turning now to FIGS. 20A-20C, reference tables 2000A-2000C providing additional information about the plurality of datapoints 802 of the exemplary record 800 of FIG. 8 are described according to an aspect. FIGS. 20A-20C, the reference tables 2000A-2000C, and the content thereof are provided only to describe an exemplary record (e.g., the record 800, herein). The discussion of FIGS. 8, 20A, 20B, and 20C herein is not intended to limit the scope of any other aspect of the present disclosure. In some implementations of the aspects of this disclosure, at least one of the record 800 and the reference tables 2000A-2000C contain a different plurality of datapoints 802 than is shown in FIGS. 8, 20A, 20B, and 20C. In some such implementations, the plurality of datapoints 802 contains additional datapoints than what is shown in the figures; in some other such implementations, the plurality of datapoints contains fewer datapoints than what is shown in the figures.

In some aspects, systems and methods disclosed herein, including the methods 1600 and 1700, the system 1800 or any process executing on the computer system 1900 enable at least using a trained machine learning (ML) model to determine an estimated time of arrival (ETA) of a railcar to a depot yard and to generate a fleet readiness alert, the method comprising: collecting, from a railcar tracking system, a trip information associated with the railcar; collecting, from a rail station data source, coordinates of at least one rail station, each of the at least one rail stations being associated with a rail carrier; creating a joined dataset by combining the trip information and the coordinates; performing feature engineering (FE) on the joined dataset to create a feature engineered output, the feature engineered output comprising a plurality of engineered features; combining the joined dataset with the feature engineered output to create ML model feature inputs for the ML model; activating the trained ML model, the trained ML model being configured to at least: accept the ML model feature inputs as an input to the ML model; determine the ETA of the railcar; and generate the fleet readiness alert, the fleet readiness alert based on the determined ETA of the railcar and indicating at least a usability status of a fleet of railcars at the depot yard within a fixed time.

ADDITIONAL DISCLOSURE

The following are provided as additional disclosure for combinations of features and aspects of the present disclosure.

A first aspect, which is a method for training a machine learning (ML) model to determine an estimated time of arrival (ETA) of a railcar to a depot yard and to generate a fleet readiness alert, the method comprising: collecting, from a railcar tracking system, a trip information associated with the railcar; collecting, from a rail station data source, coordinates of at least one rail station, each of the at least one rail stations being associated with a rail carrier; creating a joined dataset by combining the trip information and the coordinates; performing feature engineering (FE) on the joined dataset to create a feature engineered output, the feature engineered output comprising a plurality of engineered features; combining the joined dataset with the feature engineered output to create training data for the ML model; training the ML model on the training data to create the trained ML model; validating the trained ML model using a validation set to provide a validated ML model; and wherein validating comprises: inputting the validation set to the trained ML model, determining the ETA of the railcar, generating, from the trained ML model and the validation set, the fleet readiness alert based on the determined ETA and indicating at least a usability status of a fleet of railcars at the depot yard within a fixed time, and verifying an acceptable accuracy of the fleet readiness alert based on at least one historical ETA in the validation set.

A second aspect, which is the method of the first aspect, wherein the trip information comprises at least one car location message (CLM) and the coordinates comprise at least one latitude and longitude pair, each of the at least one latitude and longitude pairs associated with a standard point location code (SPLC) of a rail station, the rail station being registered to the rail carrier.

A third aspect, which is the method of the first aspect, wherein the ML model comprises a gradient boosting tree (GBT).

A fourth aspect, which is the method of the first aspect, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

A fifth aspect, which is the method of the fourth aspect, wherein determining the haversine distance further comprises: collecting, from the joined dataset, a current railcar latitude, a current railcar longitude, a destination latitude, and a destination longitude; determining a radius of a current planet in a first unit of measurement; calculating a first distance in a second unit of measurement between the destination latitude and the current railcar latitude; calculating a second distance in the second unit of measurement between the destination longitude the current railcar longitude; using the first distance and the second distance, calculate the haversine distance using a haversine distance formula; and assigning to the feature engineered output the calculated haversine distance.

A sixth aspect, which is the method of the fifth aspect, wherein: the first unit of measurement is miles; and the second unit of measurement is radians.

A seventh aspect, which is the method of the fourth aspect, wherein determining the train speed over the speed window comprises: collecting, from the joined dataset, a current CLM date, a trip start CLM date, and a plurality of miles travelled between each CLM; calculating a date of an earliest past CLM in the speed window; calculating a time difference between the date of the earliest past CLM in the speed window and the current CLM date; calculating a total distance travelled between the earliest past CLM and the current CLM date; calculating the train speed over the speed window as an average speed by dividing the total distance travelled by the time difference; and assigning, to the feature engineered output, the train speed over the speed window.

An eighth aspect, which is the method of the seventh aspect, further comprising: the speed window having a size, the size being less than or equal to the preset number of CLMs.

A ninth aspect, which is the method of the fourth aspect, wherein determining the average train speed further comprises: collecting, from the joined dataset, a current CLM date, a trip start CLM date, and a distance travelled between each CLM; calculating a difference between the trip start CLM date and the current CLM date; calculate a sum distance between the trip start CLM and the current CLM; calculate the average train speed by dividing the sum distance by the difference between the trip start CLM date and the current CLM date; and assigning, to the feature engineered output, the average train speed.

A tenth aspect, which is the method of the fourth aspect, wherein determining the number of days into the train trip further comprises: collecting, from the joined dataset, a current CLM date; collecting, from the joined dataset, a trip start CLM date; calculating a difference between the trip start CLM date and the current CLM date; and assigning to the feature engineered output, based on the difference between the trip start CLM date and the current CLM date, the number of days into the train trip.

An eleventh aspect, which is the method of the fourth aspect, wherein determining the season further comprises: collecting, from the joined dataset, a current CLM date; determining, from the CLM date, a day of a year; and assigning to the feature engineered output, based on the day of the year, the season, the assigned season being one of: a winter, a spring, a summer, and a fall.

A twelfth aspect, which is a method for using a trained machine learning (ML) model to determine an estimated time of arrival (ETA) of a railcar to a depot yard and to generate a fleet readiness alert, the method comprising: collecting, from a railcar tracking system, a trip information associated with the railcar; collecting, from a rail station data source, coordinates of at least one rail station, each of the at least one rail stations being associated with a rail carrier; creating a joined dataset by combining the trip information and the coordinates; performing feature engineering (FE) on the joined dataset to create a feature engineered output, the feature engineered output comprising a plurality of engineered features; combining the joined dataset with the feature engineered output to create ML model feature inputs for the ML model; activating the trained ML model, the trained ML model being configured to at least: accept the ML model feature inputs as an input to the ML model; determine the ETA of the railcar; and generate the fleet readiness alert, the fleet readiness alert based on the determined ETA of the railcar and indicating at least a usability status of a fleet of railcars at the depot yard within a fixed time.

A thirteenth aspect, which is the method of the twelfth aspect, wherein the ML model comprises a gradient boosting tree (GBT).

A fourteenth aspect, which is the method of the twelfth aspect, the ML model feature inputs further comprising at least: a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

A fifteenth aspect, which is the method of the twelfth aspect, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

A sixteenth aspect, which is a system for using a trained machine learning (ML) model to determine an estimated time of arrival (ETA) of a railcar to a depot yard and generate a fleet readiness alert, the system comprising: a railway access system, the railway access system: having at least one train configured to access at least one rail carrier, the railcar being configured to mechanically couple to a train of the at least one trains, and the at least one rail carrier configured to transport the railcar between the depot yard and a destination; a data acquisition subsystem communicatively coupled to a railcar tracking system and a rail station data source, and further coupled to a data storage subsystem; a fleet readiness alert generator configured to monitor the railcar, the fleet readiness alert generator comprising a processor and a non-transitory memory and further configured to perform operations comprising: collecting by the data acquisition subsystem, from the railcar tracking system, a trip information associated with the railcar; storing the trip information in the data storage subsystem; collecting by the data acquisition subsystem, from the rail station data source, coordinates of at least one rail station, each of the at least one rail stations being associated with a rail carrier of the at least one rail carriers; storing the coordinates in the data storage subsystem; creating a joined dataset by combining the trip information and the coordinates; performing feature engineering (FE) on the joined dataset to create a feature engineered output, the feature engineered output comprising a plurality of engineered features; combining the joined dataset with the feature engineered output to create ML model feature inputs for the ML model; activating the trained ML model, the trained ML model being configured to at least: accept the ML model feature inputs as an input to the trained ML model; determine the ETA of the railcar; and generate the fleet readiness alert, the fleet readiness alert based on the determined ETA of the railcar and indicating at least a usability status of a fleet of railcars at the depot yard within a fixed time.

A seventeenth aspect, which is the system of the sixteenth aspect, wherein the ML model comprises a gradient boosting tree (GBT).

An eighteenth aspect, which is the system of the sixteenth aspect, the ML model feature inputs further comprising at least: a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

A nineteenth aspect, which is the system of the sixteenth aspect, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

A twentieth aspect, which is the system of the sixteenth aspect, further comprising displaying to a user, by way of a user interface subsystem, the fleet readiness alert.

In the context of this disclosure, "A or B," shall mean "A or B or both." Additionally, any list of elements (e.g., "A, B, C, . . . , or N") shall mean one or more of each element in the list (e.g., one or more of A, B, C, . . . . N).

While aspects of the herein discuss systems and methods utilizing GBT ML models, nothing in this disclosure is intended to restrict the systems and methods disclosed herein to being used with only GBT-based ML models. Implementations of, e.g., the process 1100, the methods 1600 and 1700, and the system 1800 utilizing alternate ML models are contemplated. Such an implementation is contemplated to utilize a type of ML model that is determined to be the best fit for the use case of the implementation.

In some aspects, features created through feature engineering are usable in anomaly detection. Anomaly detection comprises flagging abnormal data patterns that indicate, e.g., either a malfunction in a provider of the ETA prediction or a malfunction in the movement of the railcar. As an example, the detection of a railcar coming to an immediate stop (that is, stopping on a dime) while travelling at two-hundred-and-fifty miles per hour would be considered an anomaly.

Throughout this disclosure, reference is made to transporting "products" using at least one railcar. In some aspects, "products" include, but are not limited to, petrochemical products and the derivatives of petrochemical products. In some aspects, the ETA that is determined (or predicted) using the trained ML model refers to an estimated time for a railcar to return to a point of origin. In other aspects, the ETA that is determined (or predicted) using the trained ML model refers to an estimated time for a railcar to arrive at a destination after leaving a point of origin.

In some aspects, transportation of a product by a railcar is considered to have three distinct stages: departure, consumption, and the return to the originating local yard. Accurate ETA predictions at departure provide the recipient information on when the railcar will arrive. Consumption includes unloading the product at the destination. In some aspects, the accurate prediction of an ETA for the return to the originating local yard has the most positive impact on the logistics of the entity using the railcar to transport the product, as described elsewhere herein.

Increasing the accuracy of an ETA prediction of a railcar advantageously enables a vendor utilizing the railcar to deliver products to a recipient to reduce resource-heavy redundancies that are intended to compensate for supply chain uncertainties introduced by inaccurate ETA predictions. Such redundancies are a resource intensive and difficult way to deal with inaccurate ETAs. More accurate ETA prediction, such as the prediction provided by the trained ML model disclosed herein, enables reduction of redundancies including but not limited to redundant railcars and the associated heavy resource usage (e.g., additional railcar storage space) and also, by reducing or eliminating inaccurate railcar ETA predictions, reduces lost revenue caused by a railcar being significantly late in arriving to a destination. Reducing lost revenue systemically increases the capital, profit, and other resources available to the vendor to conduct future operations at a target profit margin.

Increasing the accuracy of an ETA prediction of a railcar also advantageously enables a recipient of the products contained within the railcar to allocate, reserve, or expend less resources to compensate for those products arriving later than predicted. As a non-limiting example, the recipient need not purchase backup or replacement products from a second source because the railcar arrived later than predicted and the recipient has a time-sensitive need for those products. Further, purchasing backup or replacement products from a second source additionally introduces additional logistical stresses (e.g., the recipient has to store or return to the vendor excess products when the railcar arrives later than predicted and the recipient has already purchased and received backup or replacement products from a second source) and potential environmental or budgetary impacts. The more accurate ETA prediction of the railcar disclosed herein reduces or eliminates such concerns.

As described above (e.g., in the discussion of FIG. 3), a railcar trip from an origin to a destination is often analogous to a relay race. In such examples, a railcar moving from an origin to a destination is handed off from one rail carrier to another, because getting from point A to point B involves utilizing multiple rail carriers each covering a distinct geographical area. Thus, no single rail carrier possesses information on, e.g., the average speed of the railcar for the entire trip unless the rail carrier is the only rail carrier involved in the entire trip. This is a rare circumstance in railcar trips of significant length (e.g., trips crossing interstate boundaries in the United States), and thus the availability of such data cannot be relied upon in ETA predictions.

Instead, aspects of the disclosure utilize "speed windows" as described elsewhere herein. A speed window is, in some aspects, an average speed on each segment of the trip. In some aspects, each segment is associated with a different rail carrier. The average speed across each such speed window is combined to determine the overall average speed of the railcar for the entire trip.

Utilizing speed windows as described herein promotes efficient performance of the ML model, both in the training and production phases. In aspects herein, the ML model looks back at the previous speed of a railcar based on the current size of the speed window as measured by CLMs (e.g., ten CLMs, twenty-five CLMs, etc.). Speed windows between, e.g., a first point and a second point provide context about, e.g., prior point(s) within the speed window, the last point within the speed window, distance covered, time covered, velocity, etc. Sizing the speed window for the needs of an implementation of the disclosure enables further enhancing the performance of the disclosed ML model by excluding CLM-based data in excess of what the ML model uses to predict an ETA.

Some aspects herein utilize training data that either contains or enables the determination of information about an entire railcar trip. This information is usable by the ML model in making railcar ETA predictions as described herein, and includes but is not limited to haversine distance and speed windows.

Additionally, as described herein, the ML model, in both the training phase and the production phase, does not collect or determine any data covering times when the railcar is not moving. This includes but is not limited to data covering the time before the railcar departs the origin point and the time after the railcar arrives at a destination. Thus, such data is never input to the ML model.

In some aspects, this discarded or never determined data covers the delay between the release and pickup of an inactive railcar. Discarding or not determining such data avoids skewing the predicted ETA by ensuring that only trip information is used that covers the period of time from when the railcar is picked up by a rail carrier at the origin point to the time the railcar is placed into the staging yard at the destination point to await being called in. Being called in includes but is not limited to the railcar being brought into a servicing location and being prepared for another trip. Such preparation includes but is not limited to at least one of the railcar being cleaned and the railcar being loaded with a product or products.

Traditional, contemporary railcar ETA prediction methodologies described herein consider a railcar to have arrived at a destination point when an entity takes possession of the railcar for reuse. By contrast, aspects of the disclosure operate similarly to a consumer-oriented delivery service: the railcar is considered to have arrived at a destination point when the railcar is left in a location under the control of or otherwise accessible to the intended recipient. The intended recipient is responsible for calling in the railcar. Thus, the railcar is considered to have arrived as soon as the intended recipient is able to collect the railcar from the destination serving yard.

In aspects herein, an entity sets a target number of available railcars in a local yard for outbound traffic to transport products. Assuming the entity is continually producing more shippable product, production (transport of products) is dependent on the number of railcars that the entity can collect from a local yard, load with products, and dispatch to a destination. The disclosed systems and methods for railcar ETA prediction enable the entity to practicably predict, based on the predicted ETA of railcars returning to the local yard from various points, how many empty railcars are in the local yard ready for use to transport products. Additionally, in such aspects, knowing the predicted ETA of railcars returning to the local yard, according to the systems and methods disclosed herein, enables the entity to avoid production slowdowns by ensuring that a sufficient number of empty railcars are always available and ready for use in each local yard associated with the entity where production occurs. For example, if a specific local yard has fifty railcars but needs one-hundred railcars by a certain point in time to avoid a production slowdown, having an accurate ETA prediction of various railcars in other locations that are en route to the local yard ensures that the entity is able to meet that demand. More generally, having an accurate ETA prediction of various railcars in other locations that are en route to the local yard, in combination with the volume of available railcars currently at the local yard and volume of production, enables the entity to ensure that a minimum available railcar threshold to meet operational demands at the local yard is maintained while optionally reducing the safety stock of unneeded railcars—or, in other words, reducing the size of the fleet available to the local yard by disposing of railcars that will never be used. In the systems and methods disclosed herein, at least the determined ETA, the fleet readiness alert, and the usability status of the fleet of railcars provide this information to the entity.

The systems and methods disclosed herein are discussed with reference to the geography and railcar tracking systems of the United States of America. This is for exemplary purposes only. Aspects of the disclosure are operable in any geographical location where the necessary input data, as described in detail herein, is available.

In some aspects herein, the trained ML model makes a new, more accurate ETA prediction each time a railcar makes a CLM check-in. In some such aspects, this occurs whenever the railcar completes any activity that generates a valid CLM.

While aspects of the disclosure have been shown and described, modifications thereof can be made by one skilled in the art without departing from the spirit and teachings of the disclosure. The aspects described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present disclosure. The discussion of a reference in the Detailed Description of the Aspects is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for training a machine learning (ML) model to determine an estimated time of arrival (ETA) of a railcar to a depot yard and to generate a fleet readiness alert, the method comprising:

collecting, from a railcar tracking system, a trip information associated with the railcar;

collecting, from a rail station data source, coordinates of at least one rail station, each of the at least one rail stations being associated with a rail carrier;

creating a joined dataset by combining the trip information and the coordinates;

31 performing feature engineering (FE) on the joined dataset to create a feature engineered output, the feature engineered output comprising a plurality of engineered features;

combining the joined dataset with the feature engineered output to create training data for the ML model;

training the ML model on the training data to create the trained ML model;

validating the trained ML model using a validation set to provide a validated ML model; and wherein validating comprises:

inputting the validation set to the trained ML model, determining the ETA of the railcar, generating, from the trained ML model and the validation set, the fleet readiness alert based on the determined ETA of the railcar and indicating at least a usability status of a fleet of railcars at the depot yard within a fixed time, and verifying an acceptable accuracy of the fleet readiness alert based on at least one historical ETA in the validation set.

2. The method of claim 1, wherein the trip information comprises at least one car location message (CLM) and the coordinates comprise at least one latitude and longitude pair, each of the at least one latitude and longitude pairs associated with a standard point location code (SPLC) of a rail station, the rail station being registered to the rail carrier.

3. The method of claim 1, wherein the ML model comprises a gradient boosting tree (GBT).

4. The method of claim 1, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

5. The method of claim 4, wherein determining the haversine distance further comprises: collecting, from the joined dataset, a current railcar latitude, a current railcar longitude, a destination latitude, and a destination longitude; determining a radius of a current planet in a first unit of measurement; calculating a first distance in a second unit of measurement between the destination latitude and the current railcar latitude; calculating a second distance in the second unit of measurement between the destination longitude the current railcar longitude; using the first distance and the second distance, calculating the haversine distance using a haversine distance formula; and assigning to the feature engineered output the calculated haversine distance.

6. The method of claim 5, wherein: the first unit of measurement is miles; and the second unit of measurement is radians.

7. The method of claim 4, wherein determining the train speed over the speed window comprises:

collecting, from the joined dataset, a current CLM date, a trip start CLM date, and a plurality of miles travelled between each CLM;

calculating a date of an earliest past CLM in the speed window;

calculating a time difference between the date of the earliest past CLM in the speed window and the current CLM date;

calculating a total distance travelled between the earliest past CLM and the current CLM date;

32 calculating the train speed over the speed window as an average speed by dividing the total distance travelled by the time difference; and assigning, to the feature engineered output, the train speed over the speed window.

8. The method of claim 7, further comprising: the speed window having a size, the size being less than or equal to the preset number of CLMs.

9. The method of claim 4, wherein determining the average train speed further comprises: collecting, from the joined dataset, a current CLM date, a trip start CLM date, and a distance travelled between each CLM; calculating a difference between the trip start CLM date and the current CLM date; calculating a sum distance between the trip start CLM and the current CLM; calculating the average train speed by dividing the sum distance by the difference between the trip start CLM date and the current CLM date; and assigning, to the feature engineered output, the average train speed.

10. The method of claim 4, wherein determining the number of days into the train trip further comprises: collecting, from the joined dataset, a current CLM date; collecting, from the joined dataset, a trip start CLM date; calculating a difference between the trip start CLM date and the current CLM date; and assigning to the feature engineered output, based on the difference between the trip start CLM date and the current CLM date, the number of days into the train trip.

11. The method of claim 4, wherein determining the season further comprises: collecting, from the joined dataset, a current CLM date; determining, from the CLM date, a day of a year; and assigning to the feature engineered output, based on the day of the year, the season, the assigned season being one of: a winter, a spring, a summer, and a fall.

12. A method for using a trained machine learning (ML) model to determine an estimated time of arrival (ETA) of a railcar to a depot yard and to generate a fleet readiness alert, the method comprising:

collecting, from a railcar tracking system, a trip information associated with the railcar;

collecting, from a rail station data source, coordinates of at least one rail station, each of the at least one rail stations being associated with a rail carrier;

creating a joined dataset by combining the trip information and the coordinates;

performing feature engineering (FE) on the joined dataset to create a feature engineered output, the feature engineered output comprising a plurality of engineered features;

combining the joined dataset with the feature engineered output to create ML model feature inputs for the ML model;

activating the trained ML model, the trained ML model being configured to at least:

accept the ML model feature inputs as an input to the ML model;

determine the ETA of the railcar; and generate the fleet readiness alert, the fleet readiness alert based on the determined ETA of the railcar and indicating at least a usability status of a fleet of railcars at the depot yard within a fixed time.

13. The method of claim 12, wherein the ML model comprises a gradient boosting tree (GBT).

14. The method of claim 12, the ML model feature inputs further comprising at least: a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

15. The method of claim 12, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

16. A system for using a trained machine learning (ML) model to determine an estimated time of arrival (ETA) of a railcar to a depot yard and generate a fleet readiness alert, the system comprising:

a railway access system, the railway access system:

having at least one train configured to access at least one rail carrier, the railcar being configured to mechanically couple to a train of the at least one trains, and the at least one rail carrier configured to transport the railcar between the depot yard and a destination;

a data acquisition subsystem communicatively coupled to a railcar tracking system and a rail station data source, and further coupled to a data storage subsystem;

a fleet readiness alert generator configured to monitor the railcar, the fleet readiness alert generator comprising a processor and a non-transitory memory and further configured to perform operations comprising:

collecting by the data acquisition subsystem, from the railcar tracking system, a trip information associated with the railcar;

storing the trip information in the data storage subsystem;

collecting by the data acquisition subsystem, from the rail station data source, coordinates of at least one rail station, each of the at least one rail stations being associated with a rail carrier of the at least one rail carriers;

storing the coordinates in the data storage subsystem;

creating a joined dataset by combining the trip information and the coordinates;

performing feature engineering (FE) on the joined dataset to create a feature engineered output, the feature engineered output comprising a plurality of engineered features;

combining the joined dataset with the feature engineered output to create ML model feature inputs for the trained ML model;

activating the trained ML model, the trained ML model being configured to at least:

accept the ML model feature inputs as an input to the trained ML model;

determine the ETA of the railcar; and generate the fleet readiness alert, the fleet readiness alert based on the determined ETA of the railcar and indicating at least a usability status of a fleet of railcars at the depot yard within a fixed time.

17. The system of claim 16, wherein the ML model comprises a gradient boosting tree (GBT).

18. The system of claim 16, the ML model feature inputs further comprising at least:

a first speed window-based average train speed, the first speed window-based average train speed based on a first plurality of car location messages (CLMs); a latitude of the railcar; a distance to a destination of the railcar; a longitude of the railcar; an average train speed of the railcar; a second speed window-based average train speed, the second speed window-based average train speed based on a second plurality of CLMs; a route average-based ETA; a days-into-trip calculation; a railroad identifier; a CLM event; a season; and a sight code.

19. The system of claim 16, performing FE to create the feature engineered output further comprising performing FE operations on the joined dataset, the FE operations comprising: determining a haversine distance; determining a train speed over a speed window, the speed window being a preset number of car location messages (CLMs) in the joined dataset; determining an average train speed; determining a number of days into a train trip; and determining a season.

20. The system of claim 16, further comprising displaying to a user, by way of a user interface subsystem, the fleet readiness alert.

* * * * *